United States Patent
Jang et al.

(10) Patent No.: US 9,236,741 B2
(45) Date of Patent: Jan. 12, 2016

(54) APPARATUS, SYSTEM, AND METHOD FOR MANAGING ENERGY CONSUMPTION

(75) Inventors: Jae Hwi Jang, Yongin-si (KR); Jong Hyun Shin, Suwon-si (KR); Young Jin Park, Bucheon-si (KR); Hyun Soo Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 725 days.

(21) Appl. No.: 13/352,079

(22) Filed: Jan. 17, 2012

(65) Prior Publication Data

US 2012/0197451 A1    Aug. 2, 2012

(30) Foreign Application Priority Data

Jan. 27, 2011    (KR) .................. 10-2011-0008375

(51) Int. Cl.
*G06F 1/32*    (2006.01)
*H02J 3/14*    (2006.01)
(Continued)

(52) U.S. Cl.
CPC ............. *H02J 3/14* (2013.01); *G06Q 10/063* (2013.01); *G06Q 50/06* (2013.01); *H02J 2003/143* (2013.01); *H02J 2003/146* (2013.01); *Y02B 70/3225* (2013.01); *Y02B 70/3266* (2013.01);
(Continued)

(58) Field of Classification Search
CPC .... G06Q 10/063; Y04S 20/242; Y04S 20/244
USPC ........................................................ 700/291
See application file for complete search history.

(56) References Cited

U.S. PATENT DOCUMENTS 5,684,710 A    11/1997    Ehlers et al.
7,149,605 B2 *  12/2006    Chassin et al. ................. 700/295
(Continued)

FOREIGN PATENT DOCUMENTS

AG    2010-122176    6/2010
CN    1183886    6/1998
(Continued)

OTHER PUBLICATIONS

Chinese Patent Office Action issued in Chinese Patent Application No. 201210023236.8 issued Jun. 17, 2015 (14 total pages).

*Primary Examiner* — Robert Fennema
*Assistant Examiner* — Sivalingam Sivanesan
(74) *Attorney, Agent, or Firm* — Staas & Halsey LLP

(57)    ABSTRACT

A power management system includes a plurality of electrical instruments and a power management apparatus. Each of the plurality of electrical instruments has at least one characteristic function and an arbitration function which is discriminated from the characteristic function and requires power arbitration. Each electrical instrument includes a plurality of operation algorithms having at least one characteristic function, operation levels respectively corresponding to the plurality of operation algorithms, power information for the respective operation levels, and power information of the arbitration function. The power management apparatus receives power rate information from a power provider, determines the operation levels of the plurality of electrical instruments and controls the electrical instruments to be driven at the determined operation levels. When an arbitration function selection signal is received from at least one of the electrical instruments while the electrical instruments are driven, the power management apparatus adjusts operation levels of other electrical instruments.

64 Claims, 11 Drawing Sheets

(51) Int. Cl.
*G06Q 10/06* (2012.01)
*G06Q 50/06* (2012.01)

(52) U.S. Cl.
CPC .............. *Y04S 20/222* (2013.01); *Y04S 20/224* (2013.01); *Y04S 20/242* (2013.01)

(56) References Cited

U.S. PATENT DOCUMENTS

2007/0029969 A1* 2/2007 Wang et al. .................... 320/128
2009/0322151 A1* 12/2009 Ferlitsch ......................... 307/39
2010/0092625 A1 4/2010 Finch et al.
2010/0174668 A1* 7/2010 Finch et al. .................... 705/412
2011/0077789 A1* 3/2011 Sun ................................ 700/291
2011/0098869 A1* 4/2011 Seo et al. ....................... 700/296
2011/0145611 A1* 6/2011 Lee ................................ 713/320

FOREIGN PATENT DOCUMENTS

| CN | 101558687 | 10/2009 |
| CN | 101782258 | 7/2010 |
| CN | 101799681 | 8/2010 |

* cited by examiner

FIG. 3

| FIRST GROUP (G1) | SECOND GROUP (G2) | THIRD GROUP (G3) |
|---|---|---|
| WASHING MACHINE(a1), DRYING MACHINE(a2), DISH WASHER(a3) | AIR-CONDITIONER(b1), TELEVISION RECEIVER (b2), CLEANER(b3), LIGHTING(b4), REFRIGERATOR(b5), KIMCHI REFRIGERATOR(b6) | ELECTRIC OVEN(c1), COOK-TOP(c2), PRINTER(c3) |

FIG. 4A

| OPERATION LEVEL | PEAK INSTANTANEOUS POWER (kW) | AVERAGE POWER CONSUMPTION AMOUNT (kW) | OPERATION TIME(min) [POWER CONSUMPTION TIME] | OPERATION ALGORITHM |
|---|---|---|---|---|
| L0 (STANDBY LEVEL) | 0.019 | 0.019 | 0 | STANDBY STATE |
| L1 | 1.5 | 1.13 | 200 | FULL WASH/RINSE FUNCTION FULL SPIN DRY FUNCTION FULL HEAT DRY FUNCTION |
| L2 | 0.23 | 0.14 | 120 | FULL WASH/RINSE FUNCTION FULL SPIN DRY FUNCTION |
| L3 | 0.21 | 0.11 | 80 | FULL WASH/RINSE FUNCTION SIMPLE SPIN DRY FUNCTION |

FIG. 4B

| OPERATION LEVEL | PEAK INSTANTANEOUS POWER (kW) | AVERAGE POWER CONSUMPTION AMOUNT (kW) | OPERATION TIME(min) [POWER CONSUMPTION TIME] | OPERATION ALGORITHM |
|---|---|---|---|---|
| L0 (STANDBY LEVEL) | 0.02 | 0.02 | 0 | STANDBY STATE |
| L1 | 3.4 | 3.23 | NA | INDOOR UNIT K1 FILTER NORMAL OPERATION<br>INDOOR SPI UNIT NORMAL OPERATION<br>OUTDOOR UNIT FREQUENCY 100% OPERATION (85Hz) |
| L2 | 3.01 | 2.86 | NA | INDOOR UNIT K1 FILTER NORMAL OPERATION<br>INDOOR SPI UNIT NORMAL OPERATION<br>OUTDOOR UNIT FREQUENCY 84% OPERATION (75Hz) |
| L3 | 2.5 | 2.23 | NA | INDOOR UNIT STOP<br>OUTDOOR UNIT FREQUENCY 60% OPERATION (55Hz) |
| L4 | 1.4 | 1.21 | NA | INDOOR UNIT STOP<br>OUTDOOR UNIT FREQUENCY 40% OPERATION (30Hz) |

FIG. 4C

| NAME OF ELECTRICAL INSTRUMENT | CHARACTERISTIC FUNCTION | ARBITRATION FUNCTION |
|---|---|---|
| WASHING MACHINE | WASH, RINSE, SPIN DRY | DRY |
| AIR-CONDITIONER | COOLING, FILTER OPERATION, OUTDOOR UNIT FREQUENCY | DEFROST |
| REFRIGERATOR | REFRIGERATING AND FREEZING TEMPERATURE CONTROL | DEFROST, ICE-MAKING, RAPID REFRIGERATION |
| DISH WASHER | WASH, RINSE | DRY |
| ELECTRIC RICE COOKER | COOKING | WARM |

APPARATUS, SYSTEM, AND METHOD FOR MANAGING ENERGY CONSUMPTION

CROSS-REFERENCE TO RELATED APPLICATIONS

This application claims the priority benefit of Korean Patent Application No. 2011-0008375, filed on Jan. 27, 2011 in the Korean Intellectual Property Office, the disclosure of which is incorporated herein by reference.

BACKGROUND

1. Field

Example embodiments of the following description relate to an electrical instrument, a power management apparatus, a power management system having the same, and a method for controlling the same to adjust power consumption, thereby balancing supply with demand of power.

2. Description of the Related Art

With the development of information and communication technologies, the number of devices powered by electricity is rapidly increasing, and thus, power demand increases year by year. In a power demand pattern, peak capacity is not reached during most days of the year, that is to say, power plants only operate at full capacity during a few days out of the year.

A state in which a high power demand is required for a short time is called peak load. Costs for constructing an additional power plant for peak load are extremely high and maintenance costs for power plants constructed to maintain peak load for a short period are considerable.

Recently, numerous developers are conducting intensive research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. That is, a consumer uses power in response to power rates rather than according to an ordinary power consumption pattern.

According to DR, a power provider can induce users to consume power in a low power rate period, and restrain users from consuming power in a high power rate period, and thus, users can use power at a low rate.

Therefore, electrical instruments to which DR is applied have been developed. The electrical instruments are provided with real-time power rates from a power provider and are on/off controlled based on the power rates.

However, conventional electrical instruments to which DR is applied cannot efficiently execute functions that users desire because they are powered on/off based on power rates.

SUMMARY

Therefore, it is an aspect of the present disclosure to provide a power management apparatus, a power management system having the same, and a method for controlling the same to determine operation levels of electrical instruments on the basis of power rates, control the electrical instruments according to operation algorithms corresponding to the determined operation levels, and when at least one electrical instrument performs an arbitration function, adjust the operation levels of other electrical instruments.

It is another aspect of the present invention to provide a power management apparatus having a smart socket through which an arbitration function execution signal of an electrical instrument is transmitted, a power management system having the same, and a method for controlling the same.

It is another aspect of the present invention to provide a power management apparatus, a power management system having the same, and a method for controlling the same to supply additional power to a home having electrical instruments using a battery when a total power consumption amount of the home exceeds a permissible power amount due to execution of an arbitration function of at least one electrical instrument.

It is another aspect of the present invention to provide a power management apparatus, a power management system having the same, and a method for controlling the same to enable generation of an additional arbitration function of an electrical instrument that a user desires.

It is another aspect of the present invention to provide an electrical instrument driven at an operation level corresponding to a command of a power management apparatus, which requests the power management apparatus to adjust an operation level of another electrical instrument when a user selects an arbitration function.

In accordance with one aspect of the present invention, a power management apparatus includes: a communication unit to communicate with a plurality of electrical instruments; and a controller to confirm a power consumption amount of a power management area when receiving an arbitration function execution signal from at least one of the plurality of electrical instruments, compare the power consumption amount with a predetermined power amount, and adjust operation levels of other electrical instruments when the power consumption amount exceeds the predetermined power amount.

The arbitration function may correspond to at least one of a periodically performed function and a function selected by a user.

The power management apparatus may further include a storage unit to store power information for respective operation levels and information about the arbitration function, transmitted from the plurality of electrical instruments.

The information about the arbitration function may include at least one of a power amount consumed when the arbitration function is performed, an arbitration function execution start time, and an arbitration function execution end time.

The controller may adjust the operation levels of the other electronic instruments, which are operated for a time during which the arbitration function is performed.

The predetermined power amount may include at least one of a permissible power amount for each time period and a monthly critical power amount.

The communication unit may communicate with a power supply source to receive at least one of the permissible power amount for each time period and the monthly critical power amount transmitted from the power supply source, and the controller may control the power amount transmitted from the power supply source to be stored.

The controller may predict a power consumption amount for each time period of the power management area on the basis of the information about the arbitration function, compare the power consumption amount for each time period with the permissible power amount for each time period, and adjust the operation levels of the other electrical instruments if a time period in which the power consumption amount exceeds the permissible power amount is present.

The controller may calculate a today's critical power amount on the basis of the permissible power amount for each time period, predict a today's power consumption amount of the power management area on the basis of the information about the arbitration function, compare the today's power consumption amount with the today's critical power amount, and adjust the operation levels of the other electrical instruments when the today's power consumption amount exceeds the today's critical power amount.

The controller may calculate the today's critical power amount on the basis of the monthly critical power amount, predict the today's power consumption amount of the power management area on the basis of the information about the arbitration function, compare the today's power consumption amount with the today's critical power amount, and adjust the operation levels of the other electrical instruments when the today's power consumption amount exceeds the today's critical power amount.

The controller may predict a power consumption amount of this month of the power management area on the basis of the information about the arbitration function, compare the power consumption amount of this month with a critical power amount of this month, and adjust the operation levels of the other electrical instruments when the power consumption amount of this month exceeds the critical power amount of this month.

The communication unit may receive power rate information transmitted from a power supply source, and the controller may determine operation levels of the plurality of electrical instruments on the basis of the power rate information, the predetermined power amount, and power information for respective operation levels of the plurality of electrical instruments, and adjust the determined operation levels of the other electrical instruments when the arbitration function of the at least one electrical instrument is performed.

The controller may determine if the current power rate information corresponds to power rate information before the arbitration function is performed when the arbitration function is finished, restore the operation levels of the other electrical instruments to operation levels before the arbitration function is performed if the current power rate information corresponds to the power rate information before the arbitration function is performed, and re-determine the operation levels of the other electrical instruments if the current power rate information is not identical to the power rate information before the arbitration function is performed.

The controller may confirm priorities of the other electrical instruments when the power consumption amount exceeds the predetermined power amount and lower the operation levels of the other electrical instruments in ascending order of priority until the power consumption amount becomes less than the predetermined power amount.

The controller may confirm the priorities of the other electrical instruments when the power consumption amount exceeds the predetermined power amount and continuously lower an operation level of an electrical instrument, having a lowest priority, until the power consumption amount becomes less than the predetermined power amount.

The controller may continuously lower an operation level of an electrical instrument having a second lowest priority until the power consumption amount becomes less than the predetermined power amount when the power consumption amount exceeds the predetermined power amount even in a state in which the operation level of the electrical instrument having the lowest priority has been adjusted to a lowest operation level.

The power information for the respective operation levels of the plurality of electrical instruments may include at least one of a peak instantaneous power amount, an average power consumption amount, and an operation time for which power is consumed.

The controller may classify the plurality of electrical instruments into a first group which can set operation time, a second group which cannot set the operation time, and a third group which cannot set the operation time and operation levels, and adjust operation levels of electrical instruments belonging to the second group when the arbitration function execution signal is transmitted from the at least one of the plurality of electrical instruments.

The controller may maintain the operation levels of the other electrical instruments when the power consumption amount is less than the predetermined amount.

In accordance with another aspect of the present invention, a method for controlling a power management apparatus includes: confirming a power consumption amount of a power management area when an arbitration function execution signal is received from at least one of a plurality of electrical instruments; comparing the power consumption amount with a predetermined power amount; and adjusting operation levels of other electrical instruments when the power consumption amount exceeds the predetermined power amount.

The method may further include storing power information for respective operation levels and information about an arbitration function transmitted from the plurality of electrical instruments.

The information about the arbitration function may include at least one of a power amount consumed when the arbitration function is performed, an arbitration function execution start time, and an arbitration function execution end time.

The adjusting of the operation levels of the other electrical instruments may include adjusting the operation levels of the other electronic instruments, which are operated for a time during which the arbitration function is performed.

The predetermined power amount may include at least one of a permissible power amount for each time period and a monthly critical power amount.

The comparing of the power consumption amount with the predetermined power amount may include predicting a power consumption amount for each time period on the basis of the information about the arbitration function, and comparing the power consumption amount for each time period with the permissible power amount for each time period.

The comparing of the power consumption amount with the predetermined power amount may include: calculating a today's critical power amount on the basis of the permissible power amount for each time period; predicting a today's power consumption amount of the power management area on the basis of the information about the arbitration function; and comparing the today's power consumption amount with the today's critical power amount.

The comparing of the power consumption amount with the predetermined power amount may include predicting a power consumption amount of this month of the power management area on the basis of the information about the arbitration function, and comparing the power consumption amount of this month with a critical power amount of this month.

The comparing of the power consumption amount with the predetermined power amount may include: calculating the today's critical power amount on the basis of the monthly critical power amount; predicting the today's power consumption amount of the power management area on the basis of the information about the arbitration function; and comparing the today's power consumption amount with the today's critical power amount.

The method may further include receiving power rate information from a power supply source and storing the power rate information, and determining operation levels of the plurality of electrical instruments on the basis of the power rate information, the predetermined power amount, and power information for respective operation levels of the plurality of electrical instruments.

The adjusting of the operation levels of the other electrical instruments may include adjusting determined operation levels of the other electrical instruments.

The method may further include: determining whether the arbitration function is finished; determining whether power rate information before the arbitration function is performed is identical to power rate information after the arbitration function is performed when the arbitration function is finished; restoring the operation levels of the other electrical instruments to the operation levels when the arbitration function is performed when the power rate information before the arbitration function is performed is identical to the power rate information after the arbitration function is performed; and re-determining the operation levels of the other electrical instruments when the power rate information before the arbitration function is performed is different from the power rate information after the arbitration function is performed.

The determining of whether the arbitration function is finished may include determining whether an arbitration function execution end signal is received from the at least one electrical instrument.

The determining of whether the arbitration function is finished may include predicting an arbitration function execution end time on the basis of the information about the arbitration function, and determining whether current time corresponds to the predicted time.

The adjusting of the operation levels of the other electrical instruments may include confirming priorities of the other electrical instruments, and lowering the operation levels of the other electrical instruments in ascending order of priority until the power consumption amount becomes less than the predetermined power amount.

The adjusting of the operation levels of the other electrical instruments may include checking priorities of the other electrical instruments, confirming an electrical instrument having a lowest priority, and continuously lowering an operation level of the electrical instrument having the lowest priority until the power consumption amount becomes less than the predetermined power amount.

The method may further include: determining whether the operation level of the electrical instrument having the lowest priority is the lowest operation level in a state in which the power consumption amount exceeds the predetermined power amount; confirming an electrical instrument having a second lowest priority when the operation level of the electrical instrument having the lowest priority is the lowest operation level in the state in which the power consumption amount exceeds the predetermined power amount; and continuously lowering an operation level of the electrical instrument having the second lowest priority until the power consumption amount becomes less than the predetermined power amount.

Further, the priorities may be set by the user.

The adjusting of the operation levels of the other electrical instruments may include selecting an electrical instrument which cannot set operation time from the plurality of electrical instruments, and adjusting an operation level of the selected electrical instrument.

The method may further include maintaining the operation levels of the other electrical instruments if the power consumption amount is less than the predetermined power amount.

The adjusting of the operation levels of the other electrical instruments may include: confirming whether a battery is present in the power management area when the power consumption amount exceeds the predetermined power amount; supplying power of the battery to the plurality of electrical instruments when the battery is present; and adjusting the operation levels of the other electrical instruments when the battery is not present.

The method may further include blocking power supply of the battery when the arbitration function is finished.

The method may further include: comparing the power consumption amount of the power management area with the predetermined power amount when a power measurement signal is received from a smart socket; and adjusting an operation level of at least one of the plurality of electrical instruments when the power consumption amount exceeds the predetermined power amount.

The adjusting of the operation level of the at least one of the plurality of electrical instruments may include adjusting an operation level of an electrical instrument which does not perform the arbitration function.

The method may further include maintaining the operation levels of the plurality of electrical instruments when the power consumption amount is less than the predetermined power amount.

The method may further include restoring the adjusted operation level of the at least one electrical instrument when the power measurement signal is not received from the smart socket.

In accordance with another aspect of the present invention, an electrical instrument includes a communication unit to communicate with a power management apparatus, and a controller to determine whether an arbitration function is executed, transmit an arbitration function execution signal to the power management apparatus when the arbitration function is executed, control execution of the arbitration function, change an operation level of the electrical instrument when another electrical instrument performs an arbitration function, and thus, an operation level adjustment signal is transmitted from the power management apparatus, and control the electrical instrument to be driven at the changed operation level, wherein the controller independently controls execution of the arbitration function and changing of the operation level at different time points respectively.

The electrical instrument may further include a storage unit to store a plurality of operation algorithms each of which has at least one characteristic function, operation levels respectively corresponding to the plurality of operation algorithms, power information for the respective operation levels, and information about the arbitration function.

The communication unit may transmit the power information for the respective operation levels and the information about the arbitration function to the power management apparatus, according to an instruction of the controller.

The electrical instrument may further include an input unit by which a user selects the arbitration function.

In accordance with another aspect of the present invention, an electrical instrument includes a communication unit to communicate with a power management apparatus, and a controller to change an operation level of the electrical instrument when another electrical instrument performs an arbitration function, and thus, an operation level adjustment signal is transmitted from the power management apparatus, and controls the electrical instrument to be driven at the changed operation level.

The electrical instrument may further include a storage unit to store a plurality of operation algorithms having different power consumption amounts, wherein the controller changes the operation level to an operation level having power consumption lower than that of the current operation level when the operation level adjustment signal is input.

The electrical instrument may further include an input unit by which a user inputs at least one function, wherein the controller sets the function input through the input unit as an arbitration function.

In accordance with another aspect of the present invention, a power management system includes a plurality of electrical instruments having arbitration functions and a plurality of operation levels having different power consumption amounts, and a power management apparatus to confirm a power consumption amount of a power management area when receiving an arbitration function execution signal from at least one of the plurality of electrical instruments, compare the power consumption amount with a predetermined power amount, and adjust operation levels of other electrical instruments when the power consumption amount exceeds the predetermined power amount.

The information about the arbitration function may include at least one of a power amount consumed when the arbitration function is performed, an arbitration function execution start time, and an arbitration function execution end time.

The power management apparatus may adjust the operation levels of the other electrical instruments on the basis of predetermined priority when the power consumption amount exceeds the predetermined power amount.

The power management apparatus may lower the operation levels of the other electrical instruments level by level in ascending order of priority until the power consumption amount becomes less than the predetermined power amount.

The power management apparatus may lower an operation level of an electrical instrument having a lowest priority to an operation level having a power consumption amount less than the predetermined power amount.

The power management apparatus may determine the operation levels of the plurality of electrical instruments on the basis of power rate information transmitted from a power supply source and power consumption amounts corresponding to the operation levels of the plurality of electrical instruments.

The power management apparatus may store determined operation levels of the plurality of electrical instruments and restore the operation levels of the other electrical instruments to the stored operation levels when the arbitration function is finished.

The power management apparatus may classify the plurality of electrical instruments into a first group which can set operation time, a second group which cannot set the operation time, and a third group which cannot set the operation time and an operation level, and adjust operation levels of electrical instruments belonging to the second group when adjusting the operation levels.

In accordance with another aspect of the present invention, a power management system includes: a plurality of electrical instruments having arbitration functions and a plurality of operation levels having different power consumption amounts; a battery to supply power to at least one of the plurality of electrical instruments or cut off supplied power; and a power management apparatus to confirm a power consumption amount of a power management area when receiving an arbitration function execution signal from at least one of the plurality of electrical instruments, compare the power consumption amount with a predetermined power amount, and supply the power of the battery to the plurality of electrical instruments when the power consumption amount exceeds the predetermined power amount.

The power management apparatus may determine the operation levels of the plurality of electrical instruments on the basis of power rate information transmitted from a power supply source and power consumption amounts corresponding to the operation levels of the plurality of electrical instruments, and control the plurality of electrical instruments to be driven at the determined operation levels.

The power management apparatus may block power supply to the plurality of electrical instruments from the battery when an arbitration function is finished.

The power management apparatus may calculate a power excess amount when the power consumption amount exceeds the predetermined power amount and adjust the operation levels of the other electrical instruments when the calculated power excess amount is less than the power amount of the battery.

In accordance with another aspect of the present invention, a power management system includes: a plurality of first electrical instruments having a plurality of operation levels having different power consumption amounts; a smart socket connected to a second electrical instrument to meter power of the second electrical instrument; and a power management apparatus to confirm a power consumption amount of a power management area when receiving a power measurement signal through the smart socket, compare the power consumption amount with a predetermined power amount, and adjust an operation level of at least one of the first electrical instruments when the power consumption amount exceeds the predetermined power amount.

The power management apparatus may predict the power consumption amount of the power management area on the basis of a power amount measured for a predetermined time when receiving the power measurement signal through the smart socket, and compare the predicted power consumption amount with the predetermined power amount.

The power management apparatus may maintain operation levels of the plurality of electrical instruments when the power consumption amount is less than the predetermined power amount.

The power management apparatus may restore the operation level of the at least one first electrical instrument when the power measurement signal is not received through the smart socket.

According to one aspect of the present invention, an arbitration function for achieving a specific purpose is discriminated from characteristic functions of an electrical instrument, and thus, the number of operation levels of the electrical instrument can be reduced and the arbitration function can be performed at any operation level at the user's request.

In other words, since only the operation levels of the electrical instrument are changed depending on power rates when the electrical instrument performs the arbitration function, user satisfaction can be improved and user inconvenience can be minimized.

Furthermore, a total power consumption amount of the home having the electrical instrument is predicted on the basis of a power amount and time consumed when the arbitration function of the electrical instrument is performed to adjust operation levels of other electrical instruments, and thus, it is possible to manage the total power consumption amount of the home, such that it does not exceed a predetermined permissible power amount while the arbitration function of the electrical instrument is performed.

In this case, user satisfaction can be maximized by adjusting operation levels of a plurality of electrical instruments according to priority set by the user.

According to another aspect of the present invention, it is possible to adjust operation levels of electrical instruments other than a general electrical instrument that is not a smart electrical instrument when the general electrical instrument performs an arbitration function by measuring an arbitration function execution signal of the general electrical instrument using a smart socket.

Furthermore, since a function from among a plurality of functions of an electrical instrument, which is considered as important by a user, can be additionally generated as an arbitration function, a function that the user desires can be performed unconditionally, regardless of power rates.

In other words, all functions of an electrical instrument, such as, a medical instrument which must be operated at a time set by a user can be set as arbitration functions so as to eliminate inconvenience of use.

According to another aspect of the present invention, the total power consumption amount of the home having the electrical instrument is predicted on the basis of the power amount and time consumed when the arbitration function of the electrical instrument is performed, and additional power is supplied using a battery when the total power consumption amount exceeds the permissible power amount. By doing so, it is possible to manage the total power consumption amount of the home such that it does not exceed a predetermined permissible power amount while the arbitration function of the electrical instrument is performed.

Accordingly, it is possible to optimize control of operations of a plurality of electrical instruments under constraints such as the permissible power amount, power rates set on a monthly basis, etc.

Moreover, the power amount consumed by the electrical instrument can be controlled by executing operation algorithms differentiated according to power rate information to thereby maximize energy efficiency at the user side.

Additional aspects of the invention will be set forth in part in the description which follows and, in part, will be obvious from the description, or may be learned by practice of the disclosure.

BRIEF DESCRIPTION OF THE DRAWINGS

These and/or other aspects of the invention will become apparent and more readily appreciated from the following description of the embodiments, taken in conjunction with the accompanying drawings of which:

FIG. 3 shows an exemplary list of electrical instruments included in the power management system, according to an example embodiment;

FIGS. 4A and 4B show power information and operation algorithm information by operating levels of an electrical instrument included in the power management system, according to an example embodiment;

FIG. 4C shows exemplary functions of electrical instruments included in the power management system, according to an example embodiment;

DETAILED DESCRIPTION

Figure 1:
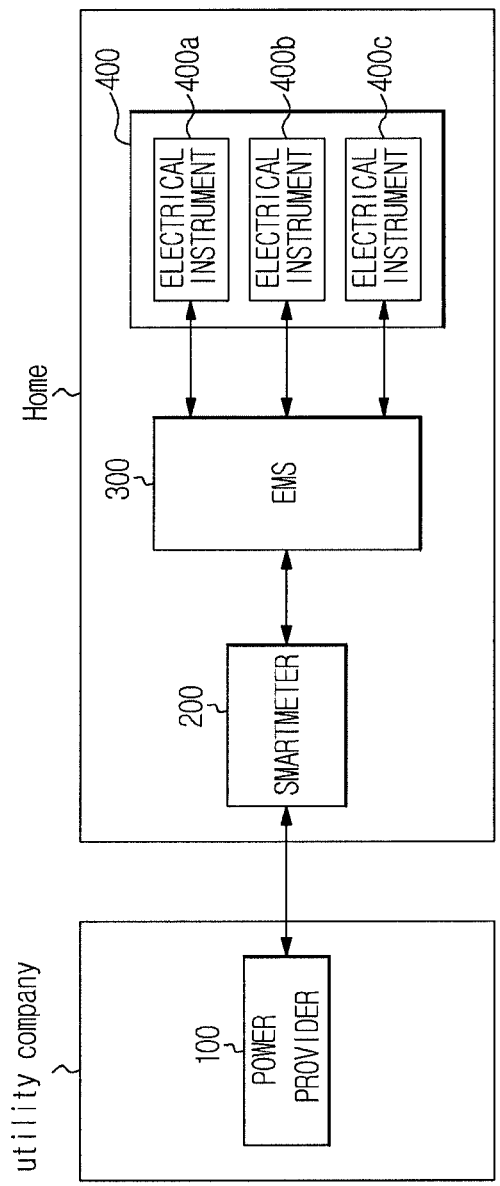
FIG. 1 is a block diagram of a power management system, according to an example embodiment.

Reference will now be made in detail to the embodiments of the present invention, examples of which are illustrated in the accompanying drawings, wherein like reference numerals refer to like elements throughout.

Figure 2:
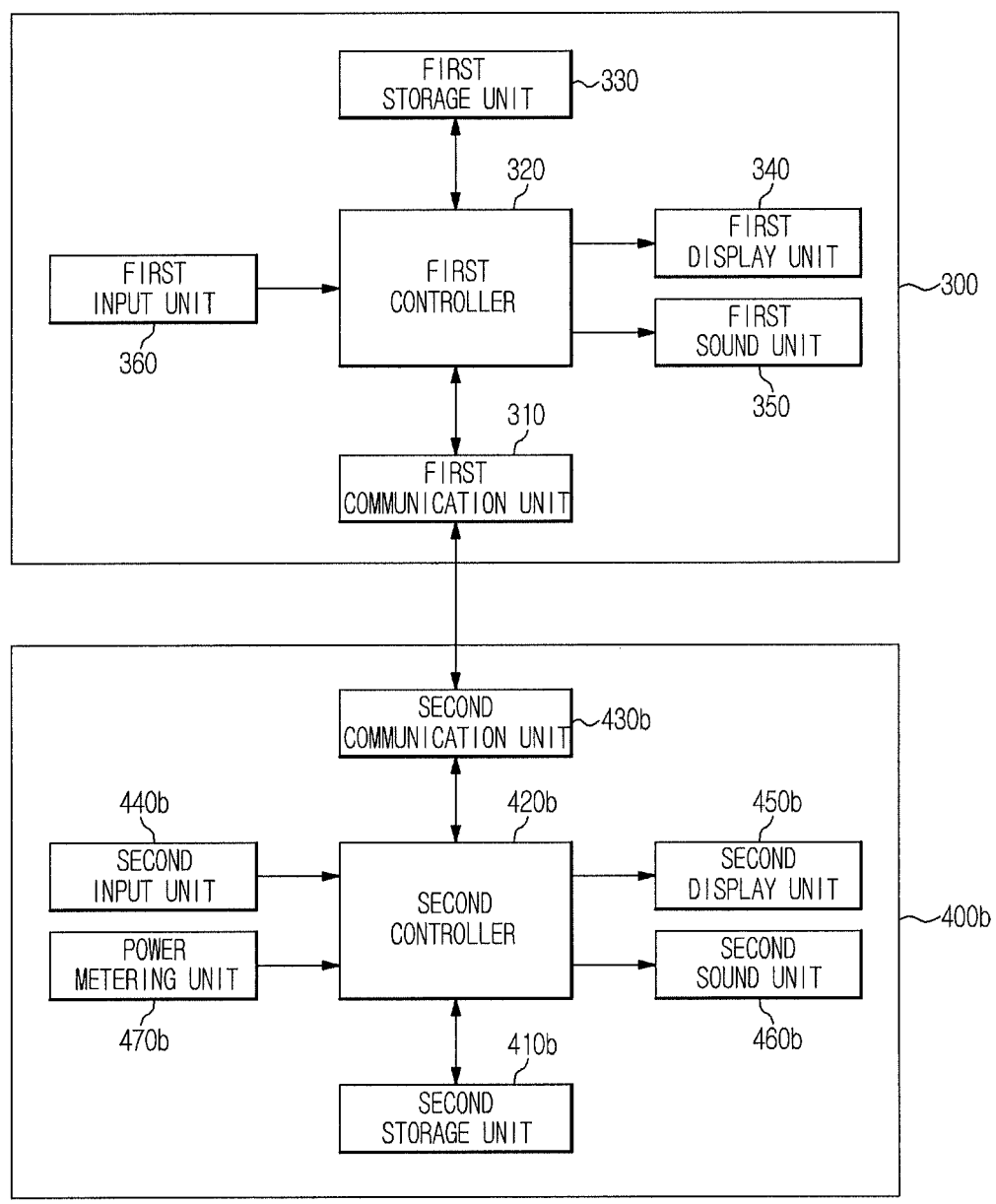
FIG. 2 is a block diagram of a power management apparatus and an electrical instrument included in the power management system, according to an example embodiment.

FIG. 1 is a block diagram of a power management system according to an embodiment of the present invention, and FIG. 2 is a block diagram of a power management apparatus and an electrical instrument included in the power management system according to an embodiment of the present invention.

Referring to FIG. 1, the power management system includes a power provider 100, a smartmeter 200, an energy management system (EMS) 300, and an electrical instrument 400 (400a, 400b and 400c).

The power provider 100 is a power supply source that is driven by a power supply company (utility company) so as to generate and provide power. The power provider 100 generates the power through atomic energy, hydroelectric power, thermoelectric power, wind power, etc., and provides the generated power to the electrical instrument 400 installed in each home.

In this case, while the amount of power provided by the utility company is constant, the amount of power consumed in each home varies with time. For example, power consumption at dawn or in the morning is lower than in the afternoon or evening and power consumption in spring and autumn is lower than in summer and winter.

Accordingly, the power provider 100 sets power rates corresponding to a low power consumption period lower than power rates corresponding to a high power consumption period, sets power rates corresponding to a low power consumption season lower than power rates corresponding to a high power consumption season, and provides power at adjusted rates to each home.

That is, the power provider 100 controls power rates of each home to be elastically adjusted in response to power consumption of each home, and provides power at the adjusted power rates to each home, such that supply and consumption of power can be balanced.

The power provider 100 predicts power consumption on the basis of the generated amount of electric power, past power use information for every season and every time period, and weather information, and determines power rates on the basis of the predicted power consumption. Further, the power provider 100 may establish a power rate level corresponding to the predicted power rates.

The power provider 100 collects power consumption amounts of individual homes classified according to individual power rate levels, and stores the collected power consumption information according to individual power rate levels, such that the power supply company calculates power rates depending upon power consumption for individual power rate levels of each home on a monthly basis, and charges each home the calculated power rates on a monthly basis.

The power provider 100 compares periodically calculated power rates with predetermined monthly power rates to determine power supply restriction, and transmits monthly power rate excess information to the EMS 300 installed in each home when the calculated power rates exceed the monthly power rates such that a monthly power rate excess event is generated through the EMS 300 installed in each home.

The power provider 100 stores a monthly critical power amount of each home and compares the power consumption amount and monthly critical power amount of each home to each other so as to determine power supply restriction.

In this manner, the power provider 100 manages power demands of individual homes on the basis of monthly critical power amounts or monthly power rates of the individual homes.

In this case, the monthly critical power amount for restricting power supply to each home may be set by the utility company or according to a contract between each home and the utility company. In addition, the monthly power rates of each home are set by a contract between each home and the utility company.

The power provider 100 stores and manages information regarding details of generation of monthly critical power amount excess event for each user and power consumption state depending upon generation of the monthly power rate excess event.

The power provider 100 is connected to the smartmeter 200, the EMS 300, and the electrical instrument 400, installed in each home, over a network, such that the power provider 100 transmits and receives information regarding power demand management over the network. This network may be any of a wired network, a wireless network, a wired/wireless hybrid network, etc.

The smartmeter 200 is installed in each home and includes a display, such as, a liquid crystal display (LCD), such that power consumed in each home is displayed in real time. The smartmeter 200 is an electronic meter, which bidirectionally communicates with the power provider 100 and the EMS 300 and transmits the consumed power amount to the power provider 100 and the EMS 300.

The smartmeter 200 receives power rate information from the power provider 100, displays the received power rate information, such that users can see the transmitted power rate information and transmits the power rate information to the EMS 300.

In addition, the smartmeter 200 may display power rate levels corresponding to power rate information when receiving the power rate information from the power provider 100 and transmit power rates and power rate level information to the EMS 300.

The EMS 300 may also be referred to as a Demand Response (DR) controller. The EMS 300 communicates with the smartmeter 200, and thus, receives the power rates and the power rate levels corresponding to the power rates from the smartmeter 200. In addition, the EMS 300 communicates with a plurality of electrical instruments 400a, 400b and 400c, and thus, receives information on the electrical instruments 400a, 400b and 400c. The EMS 300 controls the operations of the electrical instruments 400a, 400b and 400c based on power information of the electrical instruments 400a, 400b and 400c and the power rate levels received from the power provider 200.

When an arbitration function selection signal is transmitted from at least one of the electrical instruments 400a, 400b and 400c, the EMS 300 lowers an operation level of at least one of the other electrical instruments.

The EMS 300 may set power rate levels based on the power rates when only the power rates are transmitted from the power provider 100.

In this case, the EMS 300 receives the power rate information from the power provider 100 through the smartmeter 200 at a unit time interval and sets the power rate levels corresponding to the power rates using the power rate information for each unit time.

In this case, four different power rate levels DR1, DR2, DR3 and DR4 may be set. The power rate level DR1 is the lowest power rate level, and the power rate level DR4 is the highest power rate level. Power rate level is proportional to power rate.

The EMS 300 receives the monthly critical power amount excess information and monthly power rate excess information from the power provider 100 and informs a user of the monthly critical power amount excess information and monthly power rate excess information.

The EMS 300 compares a predicted (or current) power amount for each time period with a permissible power rate, controls the operations of the plurality of electrical instruments 400a, 400b and 400c depending on priority when the predicted (or current) power amount exceeds the permissible power amount, and informs the user that the predicted (or current) power amount exceeds the permissible power amount.

The EMS 300 is explained in more detail with reference to FIG. 2.

Referring to FIG. 2, the EMS 300 includes a first communication unit 310, a first controller 320, a first storage unit 330, a first display unit 340, a first sound unit 350, and a first input unit 360.

The first communication unit 310 communicates with the smartmeter 200, and thus receives the power rates and power rate levels corresponding to the power rates from the smartmeter 200 and transmits the power rates and power rate levels to the first controller 320. In addition, the first communication unit 310 communicates with the plurality of electrical instruments 400 shown in FIG. 1, and thus, receives information of the electrical instruments 400 and transmits the information to the first controller 320. Also, the first communication unit 310 receives electrical instrument driving control signals from the first controller 320 and respectively transmits the electrical instrument driving control signals to the electrical instruments 400.

Here, the information of each electrical instrument 400 includes the name of the electrical instrument, power information, etc., and electrical instrument groups have different power information items.

More specifically, when an electrical instrument belongs to a first group G1 or a second group G2, the electrical instrument has information, such as, peak instantaneous power for each operation level, an average power consumption amount, and operation time for which power is consumed. When an electrical instrument belongs to a third group G3, the electrical instrument has information such as peak instantaneous power and an average power consumption amount.

Furthermore, the first communication unit 310 transmits user information stored in the first storage unit 330 to the power provider 100 such that the power provider 100 can determine which home corresponds to power consumption information for each time period.

The first controller 320 determines a group to which each electrical instrument belongs on the basis of the power information of the electrical instruments 400a, 400b and 400c shown in FIG. 1 and controls information about electrical instrument groups to be stored in the first storage unit 330.

The first controller 320 checks whether operation time is set in power information for each operation level when determining a group to which an electrical instrument belongs, and determines the group as the first group G1 when the operation time is set. If the operation time is not set ('NA'), the first controller 320 confirms whether or not operation levels are set, determines the group as the second group G2 if the operation levels are set, and determines the group as the third group G3 if the operation levels are not set.

Referring to FIG. 3, the first group G1 includes electrical instruments which have operation cycles and enable operation time to be set for each operation level, such as, a washing machine a1, a drying machine a2, and a dish washer a3.

The second group G2 includes electrical instruments having operation time varied at the user's request, such as, an air-conditioner b1, a television receiver b2, a cleaner b3, and lighting b4, and electrical instruments, which are constantly operated and have operation algorithms varied at the user's request, such that a time period in which an operation condition is changed cannot be predicted, such as, a refrigerator b5 and a Kimchi refrigerator b6.

That is, it is difficult to set or predict a current operation algorithm maintenance time of electrical instruments belonging to the second group G2, and operation time for each operation level of the second group G2 is set to "NA".

In this case, operation levels are set on the basis of at least one of the average power consumption amount and operation time, which may be determined depending on an operation algorithm.

The third group G3 includes electrical instruments having operation algorithms varied by users, such as an electric oven c1 and a cook top c2, and electrical instruments such as a printer c3 which deteriorates the quality of output when its operation algorithm is changed. That is, the qualities of results of the electrical instruments belonging to the third group G3 are deteriorated when their operation algorithms are automatically varied, and thus, it is impossible to set operation levels of the electrical instruments.

The electrical instruments of the third group G3 have peak instantaneous power and average power consumption amounts only since their operation levels are not set.

When receiving a driving signal from at least one of the electrical instruments 400a, 400b and 400c, the first controller 320 confirms the group to which the corresponding electrical instrument belongs using a group list stored in the first storage unit 330, checks a power rate level corresponding to a time period in which the corresponding electrical instrument is driven, and performs an operation level determination process for the group on the basis of the power rate level and power information of the corresponding electrical instrument to determine an operation level of the electrical instrument.

The first controller 320 determines a time in which the power rate level is changed, the changed power rate level and an operation level at the changed power rate level, and informs the user of the time, the changed power rate level and the operation level through the first display unit 340 and the first sound unit 350. Also, the first controller 320 calculates power rates for each operation level at a power rate level to be changed, and informs the user of the calculated power rates for each operation level and operation time through the first display unit 340 and the first sound unit 350.

The first controller 320 receives power rate information from the power provider 100 and determines operation levels of the plurality of electrical instruments 400a, 400b and 400c on the basis of the power rate levels and power information for respective operation levels of the electrical instruments 400a, 400b and 400c. When receiving the arbitration function selection signal from at least one 400a of the electrical instruments 400a, 400b and 400c while the electrical instruments 400a, 400b and 400c are driven at the determined operation levels, the first controller 320 adjusts the determined operation level of at least one of the remaining electrical instruments 400b (b1, b2, b3, b4 and b5).

More specifically, the first controller 320 predicts a total power consumption amount of the home, having the electrical instruments 400, when the electrical instrument 400a performs an arbitration function on the basis of a power amount consumed during the execution of the arbitration function, and compares the predicted total power consumption amount to a predetermined permissible power amount. If the total power consumption amount is less than the permissible power amount, the first controller 320 controls the determined operation levels of the remaining electrical instruments 400b (b1, b2, b3, b4 and b5) to be maintained and controls the electrical instrument 400a to perform the arbitration function. On the other hand, if the total power consumption amount exceeds the permissible power amount, the first controller 320 confirms priorities of the remaining electrical instruments 400b (b1, b2, b3, b4 and b5) and lowers the determined operation levels of the remaining electrical instruments 400b (b1, b2, b3, b4 and b5) by one level in ascending order of priority until the total power consumption amount becomes less than the permissible power amount.

If at least one electrical instrument selects an arbitration function, the first controller 320 can adjust the operation levels of the electrical instruments 400b (b1, b2, b3, b4 and b5) belonging to the second group, which enables easiest operation level change and does not bring about user inconvenience.

In this case, the priorities of the electrical instruments 400b (b1, b2, b3, b4, b5 and b6) belonging to the second group G2 may be predetermined and stored, or input by the user and stored or changed.

The first controller 320 stores an adjusted operation level of an electrical instrument. Here, the first controller 320 stores an operation level determined before an arbitration function is performed.

The first controller 320 predicts a time for restoring the adjusted operation level of the electrical instrument on the basis of arbitration function execution start time and arbitration function execution end time, stores the predicted restoration time, and displays information representing that the restoration time cannot be predicted on the first display unit 340 when it is impossible to predict the restoration time.

In addition, if the arbitration function execution start time and arbitration function execution end time are not present, the first controller 320 may calculate the average time of previous arbitration function execution and predict the restoration time based on the calculated average time.

The first controller 320 determines whether a power rate level at the predicted restoration time corresponds to the power rate level before the arbitration function is executed at the restoration time. Further, the first controller 320 also restores the operation level to the operation level before the arbitration function is executed when the power rate level at the predicted restoration time corresponds to the power rate level before the arbitration function is executed. Additionally, the first controller 320 controls the electrical instrument to be driven at the restored operation level. If the power rate level at the predicted restoration time does not correspond to the power rate level before the arbitration function is performed, the first controller 320 re-determines the operation level of the electrical instrument on the basis of power rate levels and power information for each operation level of the electrical instrument and controls the electrical instrument to be driven at the re-determined operation level.

When an arbitration function execution end signal is transmitted to the first controller 320 from at least one of the electrical instruments, the first controller 320 may determine whether the current power rate level of the corresponding electrical instrument corresponds to the power rate level before the arbitration function is executed, restore the operation level of the electrical instrument to the operation level before the arbitration function is executed when the current power rate level corresponds to the power rate level before the arbitration function is performed, and control the electrical instrument to be driven at the restored operation level. If the current power rate level of the electrical instrument is different from the power rate level before the arbitration function is executed, the first controller 320 may re-determine the operation level of the electrical instrument on the basis of the current power rate level and power information for each operation level of the electrical instrument, and control the electrical instrument to be driven at the re-determined operation level.

Here, the power information includes at least one of a peak instantaneous power amount, an average power consumption amount, and operation time during which power is consumed.

When a signal for adding an arbitration function of at least one electrical instrument is input from the first input unit 360, the first controller 320 may generate the arbitration function of the corresponding electrical instrument, transmit the generated arbitration function to the corresponding electrical instrument, and display the arbitration function on the first display unit 340 according to a next instruction for driving the corresponding electrical instrument.

The first controller 320 adds up peak instantaneous power amounts of an electrical instrument to be driven on the basis of the information stored in the first storage unit 330 so as to predict a power amount for each time period, compares the predicted power amount with a predetermined permissible power amount, and controls the electrical instrument to be normally driven at a determined operation level if the predicted power amount is less than the permissible power amount.

If the power amount for each time period exceeds the permissible power amount, a power amount consumed so far exceeds a monthly critical power amount, or power rates depending on the power amount consumed so far exceed monthly power rates, then the first controller 320 may control the operation level of the electrical instrument to be changed to a standby level L0, at which the electrical instrument is kept in a standby state, and may control the first display unit 340 and the first sound unit 350 to inform the user that the electrical instrument is kept in the standby state.

The first storage unit 330 stores a priority order in which the electrical instruments 400a, 400b and 400c are controlled to be at standby levels when power consumption amounts of the electrical instruments 400a, 400b and 400c exceed their permissible power amounts, and stores information about the groups to which the electrical instruments 400a, 400b and 400c belong. Additionally, the first storage unit 330 stores power information of the electrical instruments 400a, 400b and 400c, such as, peak instantaneous power, average power consumption amounts, operation time, etc., and information about the arbitration function.

The first storage unit 330 stores an inconvenience factor corresponding to each operation level, and user information. Here, the user information may include a monthly critical power amount, power rates set on a monthly basis, a permissible power amount for each time period, and user's personal information.

The first display unit 340 displays a power rate level of the current time or power rate levels by time periods on a daily basis, current power rates, operation levels of the plurality of electrical instruments, power rates which will be charged when the electrical instruments are driven at the determined operation levels, and operating states when the electrical instruments are driven.

In addition, the first display unit 340 may display arbitration functions being executed by electrical instruments, display information about an electrical instrument having an operation level adjusted as an arbitration function is performed, and display operation time and power rates for each operation level of other electrical instruments. Further, the first display unit 340 may display permissible power amounts by time periods and power, rates thus far.

When a power rate level is changed, the first display unit 340 displays the changed power rate level as characters, and displays a time period required for the power rate level to be changed as characters. When an operation level of an electrical instrument is changed by the user, the first display unit 340 displays the changed operation level and power rates, depending on the changed operation level.

Further, the first display unit 340 displays a recommended operation time of an electrical instrument to be driven, which is effective for saving power, when the electrical instrument belongs to the third group G3.

The first sound unit 350 outputs a next power rate level as sound, outputs a time required for the power rate level to be changed to the next power rate level as sound, and outputs the operation level of an electrical instrument to be driven and power rates corresponding to the operation level as sound. Accordingly, the user can easily recognize the next power rate level, the time required for the power rate level to be changed to the next power rate level, the operation level, and the power rates.

If the operation level of the electrical instrument is changed by the user, the first sound unit 350 outputs the changed operation level and power rates corresponding to the changed operation level as sound, such that the user can easily recognize them.

The first sound unit 350 outputs operation time and power rates for respective operation levels of the plurality of electrical instruments as sound, and outputs information regarding excess of permissible power amount for each time period, excess of monthly critical power amount and excess of monthly power rates as sound.

The first input unit 360 receives user information, transmits the user information to the first controller 320, receives priorities of the plurality of electrical instruments, transmits the priorities to the first controller 320, and transmits an operation level of an electrical instrument to be driven to the first controller 320 when the operation level is selected by the user.

Upon reception of information about generation of an additional arbitration function of at least one electrical instrument, the first input unit 360 may transmit the information to the first controller 320.

As an example, the first input unit 360 may be integrated with the first display unit 340 and configured in the form of a touchscreen.

As described above, operation levels are differentiated, such that a power consumption amount or operation time can be selected. Accordingly, an operation level suitable for power rate level variation can be determined so as to effectively use power depending upon power rate levels.

It is possible to reduce the number of operation levels of an electrical instrument and perform an arbitration function at any operation level at the user's request by differentiating the arbitration function for achieving a specific purpose from the characteristic function of the electrical instrument.

Here, the arbitration function is discriminated from the characteristic function and requires high power compared to the characteristic function, and thus, a total power consumption amount may exceed an permissible power amount if the arbitration function is performed.

If a total power amount consumed when the arbitration function is executed exceeds the permissible power amount, then operation levels of other electrical instruments are lowered so as to reduce the total power consumption amount to below the permissible power amount. That is, the arbitration function requires power arbitration at the home having the electrical instruments through control of the operation levels of other electrical instruments.

In other words, only the operation level of an electrical instrument is changed depending on a power rate level when the electrical instrument performs an arbitration function, and thus, user satisfaction can be improved and user inconvenience can be minimized.

Furthermore, it is possible to manage the total power consumption amount of the home, such that the total power consumption amount does not exceed the permissible power amount while the arbitration function of the electrical instrument is performed by predicting the total power consumption amount of the home on the basis of a power amount and time consumed when the arbitration function is executed and adjusting the operation levels of the other electrical instruments.

Here, the operation levels of the plurality of electrical instruments can be adjusted depending on priority set by the user so as to maximize user satisfaction.

The electrical instrument 400 transmits predetermined information to the EMS 300. Here, the predetermined information includes the name of the electrical instrument 400, power information for each operation level, and arbitration function information.

That is, the electrical instrument 400 transmits the power information for each operation level to the EMS 300 and executes an operation algorithm at an operation level determined by the EMS 300 when the user instructs the electrical instrument 400 to be driven or at reservation time, to thereby perform its characteristic function. If the arbitration function is selected, the electrical instrument 400 performs the arbitration function regardless of power rate levels.

Here, the power information for each operation level may be set when the electrical instrument 400 is manufactured or may be additionally set by the user.

Moreover, if the user does not want the electrical instrument 400 to operate at an operation level determined by an operation level determination process performed in the EMS 300, the electrical instrument 400 may directly receive an operation level from the user.

Here, the operation level is received from the user through the EMS 300 or the electrical instrument 400.

The electrical instrument 400b from among the plurality of electrical instruments 400a, 400b and 400c will now be explained in detail.

Referring to FIG. 2, the electrical instrument 400b includes a second storage unit 410b, a second controller 420b, a second communication unit 430b, a second input unit 440b, a second display unit 450b, a second sound unit 460b, and a power metering unit 470b.

The second storage unit 410b stores the name of the electrical instrument 400b, peak instantaneous power amounts, average power amounts, operation time for which power is consumed, and operation algorithms configured by combinations of a plurality of characteristic functions of the electrical instrument 400b, which correspond to respective operation levels. Also, the second storage unit 410b stores peak instantaneous power, an average power consumption amount, an operation level for each operation algorithm, and information about the arbitration function for achieving a specific purpose.

In addition, the second storage unit 410b stores peak instantaneous power, average power, and operation time in which power is consumed, which correspond to a standby level. Here, the operation time is stored as 'NA' if it cannot be set.

The peak instantaneous power, average power consumption amount, and operation time are values provided by the electrical instrument manufacturer or real-time measurement values obtained by a corresponding operation algorithm, and they can be updated.

FIG. 4A is a table showing power information and operation algorithm information by operation levels of a washing machine, FIG. 4B is a table showing power information and operation algorithm information by operation levels of an air-conditioner, and FIG. 4C is a table showing functions of electrical instruments.

Here, operation levels are set on the basis of at least one of an average power consumption amount and operation time which may be determined depending on an operation algorithm.

Referring to FIG. 4A, the washing machine has a standby level L0 and three operation levels L1, L2 and L3.

The standby level L0 is a level when the washing machine is in a standby state and has peak instantaneous power of 0.019 kW, an average power consumption amount of 0.019 kW, and operation time of 0.

The operation levels L1, L2 and L3 may be distinguished from one another. In the operation algorithms of the washing machine, a function corresponding to the operation level L3 is simpler than a function corresponding to the operation level L1. Accordingly, it is noted that the peak instantaneous power, average power consumption amount and operation time decrease as the operation level is changed from L1 to L3.

In other words, functions of the operation algorithms of the washing machine, such as, washing time, rinsing time, spin drying time, the number repetitions of a cycle, water temperature, motor speed, etc., are differentiated depending on the operation levels, such that power consumption amounts corresponding to the respective functions are differentiated.

Referring to FIG. 4B, the air-conditioner has a standby level L0 and four operation levels L1, L2, L3 and L4.

The standby level L0 is a level when the air-conditioner is in a standby state and has peak instantaneous power of 0.02 kW, an average power consumption amount of 0.02 kW, and operation time of 0.

The operation levels L1, L2, L3 and L4 of the air-conditioner correspond to differentiated operation algorithms respectively. It is noted that the peak instantaneous power and average power consumption amount decrease as the operation level is changed from L1 to L4.

In other words, functions of the operation algorithms of the air-conditioner, such as, an indoor unit filter operation, an outdoor unit frequency, an indoor unit SPI operation, an indoor unit operation, etc., are differentiated depending on the operation levels, such that power consumption amounts corresponding to the respective functions are differentiated.

While operation levels are defined by electrical instrument manufacturers through a combination of appropriate operations and conditions in consideration of characteristics of products, it is possible to additionally generate operation levels by the user.

Referring to FIG. 4C, each electrical instrument has characteristic functions for achieving its own purpose and an arbitration function for achieving a specific purpose, which is an additional function or a function for maintaining the performances of the characteristic functions.

Here, although the characteristic functions vary with operation parameters, functions of the electrical instruments are not varied.

In the case of the air-conditioner, although an outdoor unit frequency or set temperature is changed depending on operation level, a characteristic function of maintaining indoor temperature and humidity is not varied. In the case of the washing machine, while a washing temperature or a spinning speed is changed depending on operation level, characteristic functions of washing, rinsing and spin-drying are not changed. In the case of the refrigerator, though its inner temperature is varied depending on operation level, a characteristic function of maintaining the inner temperature for keeping food fresh is not changed.

The arbitration function is a function for achieving a specific purpose and it has periodicity, consumes a large amount of power within a short time, or is selected by the user.

For example, a drying function of the washing machine is not included in the characteristic functions of the washing machine, that is, washing, rinsing and spinning functions, and is selectively performed by a user. A drying function of a dish washer is not included in the characteristic functions of the dish washer, that is, washing and rinsing functions, and is selectively performed by a user. A warming function of an electric rice cooker is an additional function selected by a user.

In addition, a defrosting function of the air-conditioner is periodically performed to improve indoor temperature maintenance performance regardless of indoor temperature maintenance for air-conditioning. Defrosting, ice-making and rapid refrigerating functions of the refrigerator are irrelevant to a characteristic function of maintaining a temperature for keeping food fresh.

In other words, the defrosting function is periodically performed to improve refrigerating and freezing performance efficiency and it may affect refrigeration efficiency or be directly connected to product liability when it is not performed. Further, the ice-making function is an additional function selected by a user. The rapid refrigerating function is performed in a special case according to a state (temperature or weight) of food stored in the refrigerator or selectively executed by a user.

Here, the drying function of the washing machine and the defrosting function of the refrigerator consume a large amount of power due to heating operations.

The second controller 420*b* retrieves the name of the electrical instrument 400*b*, peak instantaneous power and average power consumption amount for each operation level, operation time information, and arbitration function information from the second storage unit 410*b* and transmits the retrieved information to the EMS 300 when receiving a signal for additionally registering the electrical instrument 400*b* in the EMS 300.

The second controller 420*b* controls the electrical instrument 400*b* to be driven according to an operation algorithm corresponding to an operation level transmitted from the EMS 300. If an arbitration function of another electrical instrument is performed and an adjusted operation level is transmitted from the EMS 300, the second controller 420*b* adjusts the current operation level to the operation level transmitted from the EMS 300 and controls the electrical instrument 400*b* to be driven according to an operation algorithm corresponding to the adjusted operation level.

The second controller 420*b* controls the electrical instrument 400*b* to be driven according to an operation algorithm corresponding to a user command when the user inputs a drive start signal if the electrical instrument 400*b* belongs to the third group G3.

The second controller 420*b* additionally generates an arbitration function when the user inputs an arbitration function addition signal, stores the generated arbitration function in the second storage unit 410*b*, and transmits information about the additionally generated arbitration function to the EMS 300 through the second communication unit 430*b*.

Here, it is also possible to store information, such as, peak instantaneous power and function execution time, measured when a previous arbitration function was performed, with the additionally generated arbitration function.

The second communication unit 430*b* transmits information of the electrical instrument 400*b* to the first communication unit 310 of the EMS 300, according to the instruction of the second controller 420*b*, and transmits operation level information received from the first communication unit 310 of the EMS 300 to the second controller 420*b*.

The second input unit 440*b* receives a driving instruction signal or driving reservation time information from the user and transmits the received signal to the second controller 420*b*.

The second input unit 440*b* transmits additional arbitration function generation information to the second controller 420*b* when the user inputs an additional arbitration function generation command.

The second display unit 450*b* displays the operation level and operation state of the electrical instrument 400*b* when the electrical instrument 400*b* is driven, and displays a varied power rate level if the power rate level is varied. Also, the second display unit 450*b* displays a state that an arbitration function is being performed when the arbitration function is executed and displays a changed operation level when the operation level is changed due to execution of an arbitration function of another electrical instrument.

The second sound unit 460*b* outputs sound at an operation start time and operation end time of the electrical instrument 400*b* so as to notify the user of the operation start time and operation end time of the electrical instrument 400*b*, and outputs sound when the power rate level is changed to inform the user of power rate level change time.

The power metering unit 470*b* meters a power amount in real time when the electrical instrument 400*b* is driven and transmits the metered power amount to the second controller 420*b* so as to meter actual power amount consumed by the electrical instrument 400*b* and update power information by operation levels, stored in the second storage unit 410*b*.

The power metering unit 470*b* meters power using a voltage across both ends of an AC power line connected to a power connector of the electrical instrument 400b and current measured from one of the AC power lines connected to the power connector.

Figure 5:
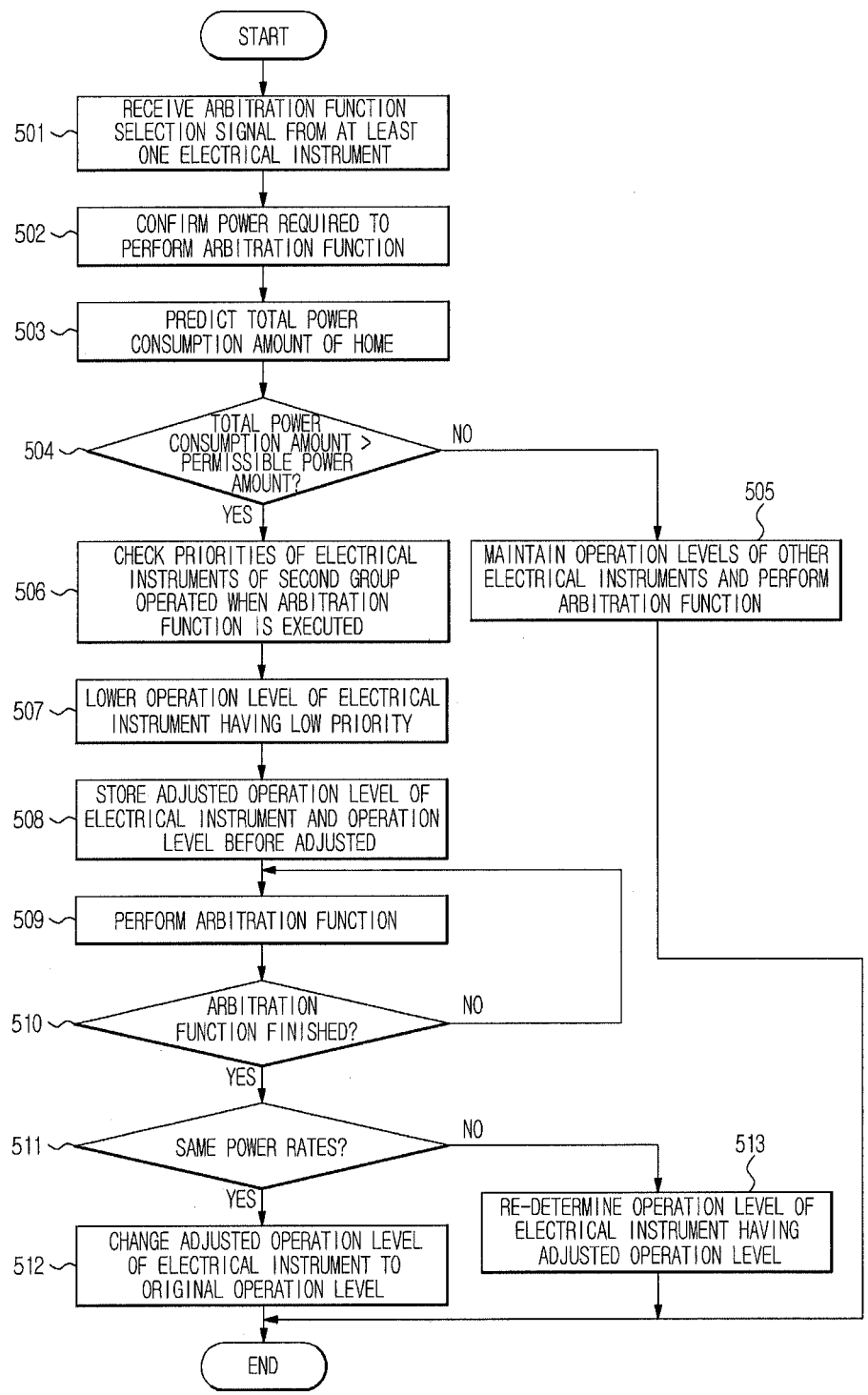
FIG. 5 is a flowchart illustrating a process of controlling a power management system, according to an example embodiment.

FIG. 5 is a flowchart illustrating a process of controlling the power management system according to an embodiment of the present invention.

The EMS 300 receives power information for each operation level from the plurality of electrical instruments 400a, 400b and 400c.

The EMS 300 determines groups to which the electrical instruments 400a, 400b and 400c belong on the basis of the power information for each operation level of the electrical instruments 400a, 400b and 400c, and stores information about the groups and the power information.

More specifically, when the EMS 300 determines the groups to which the electrical instruments belong, the EMS 300 confirms whether operation time of an electrical instrument is set in the power information for each operation level of the electrical instrument, and determines the electrical instrument as the first group G1 when the operation time is set. The EMS 300 confirms whether operation levels of the electrical instrument can be set when the operation time is not set, determines the electrical instrument as the second group G2 if the operation levels can be set, and determines the electrical instrument as the third group G3 if the operation levels cannot be set.

The EMS 300 determines whether a driving signal or a reservation signal is input from at least one of the electrical instruments 400a, 400b and 400c.

If an electrical instrument driving instruction signal is input by the user, the EMS 300 searches the group list to confirm the group of the corresponding electrical instrument.

It is assumed that the electrical instrument 400a belongs to the first group, the electrical instrument 400b belongs to the second group, and the electrical instrument 400c belongs to the third group.

After confirmation of the group of the corresponding electrical instrument, the EMS 300 checks whether the corresponding electrical instrument belongs to the third group, performs a process of determining an operation level of the group of the electrical instrument on the basis of a next power rate level if the electrical instrument does not belong to the third group so as to determine the operation level, and informs the user of the determined operation level through characters or sound.

The EMS 300 calculates power rates by operation levels if the electrical instrument 400a to be driven belongs to the first group, calculates respective level values by reflecting inconvenience factors by the operation levels in the power rates by the operation levels, and determines an operation level corresponding to a minimum level value as an optimum operation level.

The EMS 300 determines an operation level according to the following three operation level determination processes if the electrical instrument 400b to be driven belongs to the second group.

The first operation level determination process calculates average operation time of the electrical instrument 400b, calculates power rates by operation levels on the assumption that the electrical instrument 400b operates for the average operation time, calculates respective level values by reflecting inconvenience factors by the operation levels in the power rates by the operation levels, and determines a level corresponding to a minimum level value as an operation level.

The second operation level determination process calculates average operation time of the electrical instrument 400b, combines respective operation levels on the basis of the number of power rate level variations in the average operation time, calculates power rates by combinations on the basis of respective power rate levels, calculates respective level values by reflecting the inconvenience factors by the operation levels in the power rates, and determines a level corresponding to a minimum level value as an operation level. If N operation levels are set, $N^3$ combinations are generated when the power rate level is changed three times.

The third operation level determination process calculates power rates by the operation levels in a period from operation start time of the electrical instrument 400b to power rate level variation time, calculates respective level values by reflecting the inconvenience factors by the operation levels in the power rates by the operation levels, and determines a level corresponding to a minimum level value as an operation level. If a time at which the power rate level is changed while the electrical instrument 400b is driven is present, the third operation level determination process re-determines an operation level at this time, and informs the user of the re-determination of the operation level by controlling the first display unit 340 and the first sound unit 350.

When the EMS 300 determines that the electrical instrument 400c belongs to the third group, the EMS 300 determines operation time corresponding to minimum power rates on the basis the peak instantaneous power and average power consumption amount of the electrical instrument 400c, and recommends the determined operation time. That is, the EMS 300 may inform the user of the recommended operation time using characters or sound.

In other words, the EMS 300 can effectively drive the electrical instrument 400 and reduce power consumption by appropriately controlling operation algorithms differentiated depending on operation levels according to power rate levels.

Subsequently, when the EMS 300 receives an arbitration function selection signal from at least one electrical instrument 400a while the plurality of electronic instruments is driven at the determined operation levels (501), the EMS 300 confirms power consumed when the corresponding electrical instrument 400a performs an arbitration function (502). Here, the EMS 300 confirms peak instantaneous power required to perform the arbitration function.

Then, the EMS 300 adds up peak instantaneous power amounts of an electrical instrument to be driven on the basis of the information stored in the first storage unit 330 and adds the sum of the peak instantaneous power amounts to a peak instantaneous power amount consumed when the arbitration function is performed so as to predict a total power consumption amount of the home having the electrical instruments (503). Next, the EMS 300 compares the predicted total power consumption amount with a predetermined permissible power amount (504).

Here, the EMS 300 maintains the operations of the remaining electrical instruments 400b (b1, b2, b3, b4 and b5) at the determined operation levels if the total power consumption amount of the home is less than the permissible power amount, and controls the electrical instrument 400a to perform the arbitration function (505).

If the total power consumption amount of the home exceeds the permissible power amount, the EMS 300 confirms priority order of the remaining electrical instruments 400b (b1, b2, b3, b4 and b5) while the electrical instrument 400a performs the arbitration function (506).

Here, the EMS confirms the priority order of the electrical instruments 400b (b1, b2, b3, b4, b5 and b6) belonging to the second group, which enables easiest operation level change and does not bring about user inconvenience and adjusts operation levels of the electrical instruments 400*b* (b1, b2, b3, b4 and b5) based on the confirmed priority order.

Adjusting the operation levels of the electrical instruments 400*b* (b1, b2, b3, b4 and b5) belonging to the second group on the basis of the priority order may be implemented by the following two methods.

According to a first method, the EMS 300 lowers the operation levels of the electrical instruments 400*b* (B1, b2, b3, b4 and b5) by one level in ascending order of priority until the total power consumption amount becomes less than the permissible power amount (507). Here, the operation levels of the electrical instruments 400*b* (b1, b2, b3, b4, b5 and b6) are determined on the basis of power rates.

For example, if the priority order is b1→b2→b5→b6→b3→b4, then the operation level of the electrical instrument b4 having the lowest priority is lowered by one level. If the total power consumption amount exceeds the permissible power amount after the operation level of the electrical instrument b4 is lowered, then the operation level of the electrical instrument b3 having the second lowest priority is lowered by one level. If the total power consumption amount exceeds the permissible power amount after the operation level of the electrical instrument b3 is lowered, then the operation level of the electrical instrument b6 having the third lowest priority is lowered by one level. In this manner, the operation levels of the remaining electrical instruments are lowered until the total power consumption amount becomes less than the permissible power amount.

According to a second method, the EMS 300 indiscreetly lowers the operation level of the electrical instrument having the lowest priority among the remaining electrical instruments 400*b* (b1, b2, b3, b4 and b5) from the determined operation level until the total power consumption amount becomes less than the permissible power amount.

If the total power consumption amount exceeds the permissible power amount, even when the operation level of the electrical instrument having the lowest priority has been lowered to a lowest operation level, the EMS 300 continuously lowers the operation level of an electrical instrument with the second lowest priority from the determined operation level until the total power consumption amount becomes less than the permissible power amount.

For example, if the priority order is b1→b2→b5→b6→b3→b4, then the operation level of the electrical instrument b4 having the lowest priority is continuously lowered. If the total power consumption amount exceeds the permissible power amount after the operation level of the electrical instrument b4 is continuously lowered, then the operation level of the electrical instrument b3 having the second lowest priority is continuously lowered. In this manner, the operation levels of the remaining electrical instruments are continuously lowered until the total power consumption amount becomes less than the permissible power amount.

The EMS 300 stores the adjustable operation level of the electrical instrument. In this case, the EMS 300 stores the operation level determined before the arbitration function is performed (508) and transmits the adjusted operation level to the electrical instrument, which has the adjustable operation level.

Accordingly, an electrical instrument having an adjusted operation level is driven by an operation algorithm corresponding to the operation level adjusted by the EMS 300. An electrical instrument having an unadjusted operation level is driven according to an operation algorithm corresponding to an operation level determined by the EMS 300. The at least one electrical instrument 400*a* performs the arbitration function (509).

Then, the EMS 300 determines whether the electrical instrument 400*a* finishes the arbitration function (510).

In this case, a method of determining whether the electrical instrument 400*a* finishes the arbitration function may be implemented by the following two methods.

In a first method, if information about an arbitration function execution start time and arbitration function execution end time of the electrical instrument 400*a* is present, the EMS 300 predicts a time for restoring the adjusted operation level of the electrical instrument 400*a* on the basis of the arbitration function execution start time and arbitration function execution end time of the electrical instrument 400*a*, and determines that the arbitration function is finished at the predicted restoration time.

If the information about the arbitration function execution start time and arbitration function execution end time of the electrical instrument 400*a* is not present, the EMS 300 may calculate average time of previous arbitration function execution, and predict the restoration time on the basis of the calculated average time.

In a second method, the EMS 300 displays information representing that the restoration time cannot be predicted on the first display unit 340 when the time for restoring the adjusted operation level of the electrical instrument cannot be predicted, and determines that the arbitration function is finished when an arbitration function execution end signal is transmitted from the electrical instrument 400*a*.

Subsequently, the EMS 300 determines whether a power rate level corresponding to the predicted restoration time is equal to the power rate level before the arbitration function is performed (511) at the restoration time when the arbitration function of the electrical instrument 400*a* is finished. If the power rate level corresponding to the predicted restoration time is equal to the power rate level before the arbitration function is performed, the EMS 300 restores the adjusted operation level of the electrical instrument to the operation level before the arbitration function is performed (512), and drives the electrical instrument by an operation algorithm corresponding to the restored operation level.

On the other hand, if the power rate level corresponding to the predicted restoration time is different from the power rate level before the arbitration function is performed, the EMS 300 re-determines the operation level of the electrical instrument (513) on the basis of a power rate level at the restoration time and power information for each operation level of the electrical instrument, and drives the electrical instrument according to an operation algorithm corresponding to the re-determined operation level.

Figure 6:
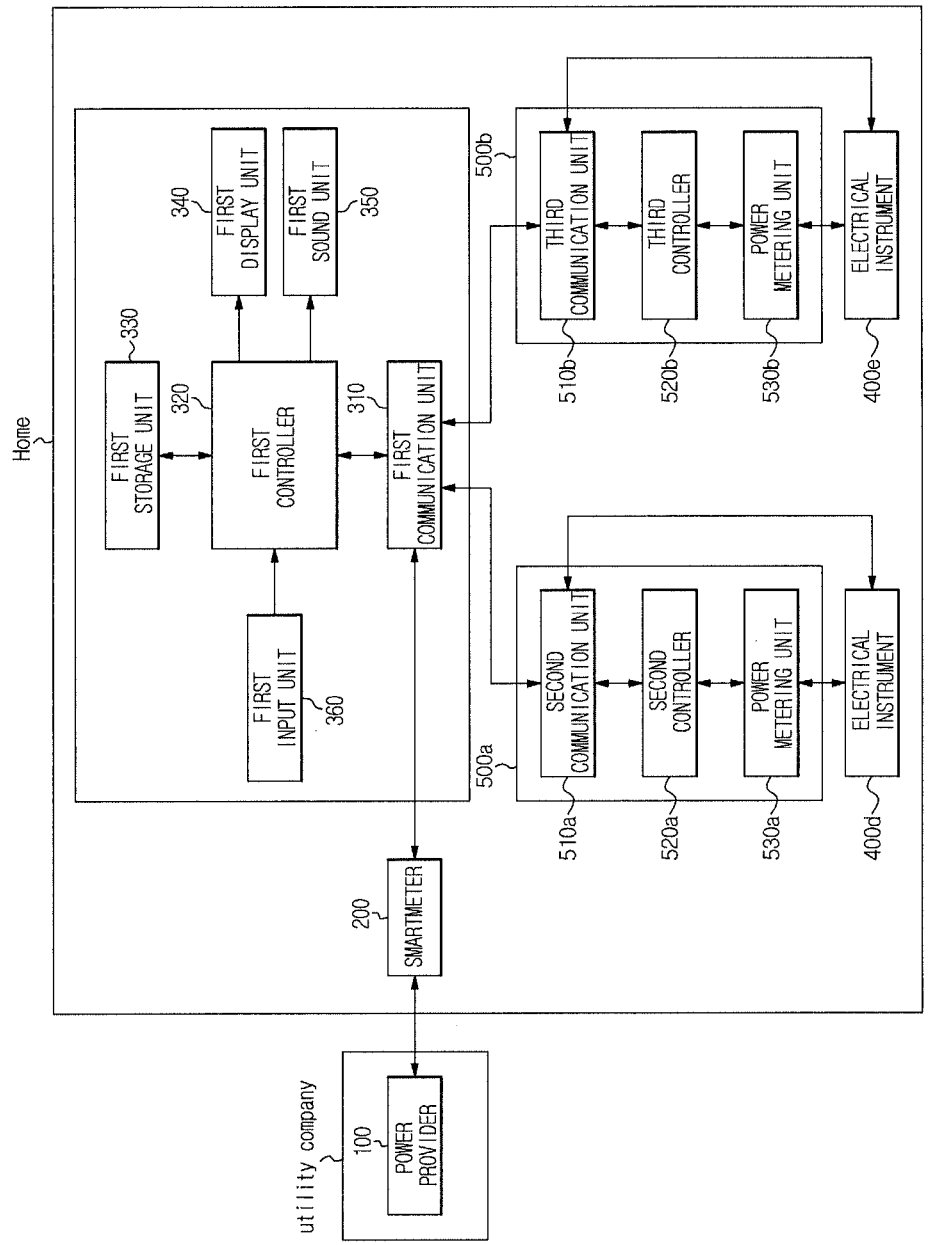
FIG. 6 is a block diagram of a power management system, according to another example embodiment.

FIG. 6 is a block diagram of a power management system according to another embodiment of the present invention. The power management system includes the power provider 100, the smartmeter 200, the EMS 300, smart electrical instruments, general electrical instruments 400*d* and 400*e*, and smart sockets 500*a* and 500*b*. Here, the smart electrical instruments correspond to a first electrical instrument which meters power consumption thereof and communicates with the EMS 300, and the general electrical instruments correspond to a second electrical instrument which cannot meter power and cannot communicate with the EMS 300.

The power provider 100 and the smartmeter 200 are identical to those illustrated in the above embodiment, and thus, explanations thereof are omitted.

The EMS 300 may also be referred to as a DR controller. The EMS 300 communicates with the smart sockets 500*a* and 500b to receive power information of the general electrical instruments 400d and 400e, corresponding to the second electrical instrument and directly communicates with the smart electrical instruments. The smart electrical instruments correspond to the first electrical instrument to receive power information of the smart electrical instruments to thereby control operations of the smart electrical instruments on the basis of the power information of both the smart and general electrical instruments and power rate levels provided by the power provider 100.

When the EMS 300 is connected to at least one of the general electrical instruments 400d and 400e through the smart sockets 500a and 500b, the EMS 300 receives power information of the connected general electrical instrument, measured by the corresponding smart socket, and lowers an operation level of at least one of the smart electrical instruments on the basis of the power information of the connected general electrical instrument.

The power information of the general electrical instrument includes peak instantaneous power of the general electrical instrument, measured for a predetermined time, operation time, etc.

The EMS 300 determines a time when the general electrical instrument is connected to the corresponding smart socket. The EMS 300 may predict operation time of the general electrical instrument connected to the smart socket on the basis of information on previous use of the general electrical instrument if the user directly inputs information regarding the general electrical instrument, and may also predict operation end time on the basis of the time when the general electrical instrument is connected to the smart socket and the operation time.

As shown in FIG. 6, the EMS 300 includes the first communication unit 310, the first controller 320, the first storage unit 330, the first display unit 340, the first sound unit 350, and the first input unit 360. Here, the first storage unit 330, the first display unit 340, the first sound unit 350 and the first input unit 360 are identical to those of the EMS 300 described in the above embodiment, and thus, explanations thereof are omitted. Also, a configuration for determining an operation level in the first controller 320 is identical to that of the EMS 300 described in the above embodiment, and thus, explanation thereof is omitted.

The first communication unit 310 communicates with the smart sockets 500a and 500b to receive power information of the plurality of general electrical instruments 400d and 400e connected to the smart sockets 500a and 500b and transmits the power information to the first controller 320. The first communication unit 310 receives driving control signals for the plurality of smart electrical instruments from the first controller 320 and respectively transmits the driving control signals to the smart electrical instruments.

The first controller 320 receives power rate information from the power provider 100, and determines operation levels of the smart electrical instruments on the basis of power rate levels and power information for each operation level of the smart electrical instruments. When the power information of the general electrical instruments 400d and 400e is transmitted from at least one of the smart sockets 500a and 500b, the first controller 320 may adjust a determined operation level of the at least one of the smart electrical instruments on the basis of the transmitted power information of the general electrical instruments 400d and 400e so as to manage a total power consumption amount of the home, having the smart and general electrical instruments, such that it does not exceed an permissible power amount even when the general electrical instruments are used.

More specifically, when at least one general electrical instrument is connected to the smart sockets, the first controller 320 predicts the total power consumption amount of the home on the basis of a power amount consumed by the general electrical instrument, and compares the total power consumption amount with a predetermined permissible power amount. If the total power consumption amount is less than the permissible power amount, the first controller 320 controls a determined operation level of at least one 400b of the plurality of smart electrical instruments to be maintained. If the total power consumption amount exceeds the permissible power amount, the first controller 320 checks priority order of the plurality of smart electrical instruments and lowers determined operation levels of the smart electrical instruments by one level in ascending manner of priority until the total power consumption amount becomes less than the permissible power amount.

If at least one electrical instrument selects an arbitration function, the first controller 320 can adjust the operation levels of electrical instruments belonging to the second group, which enables easiest operation level change and does not bring about user inconvenience.

Here, priorities of the electrical instruments belonging to the second group G2 may be predetermined and stored, or inputted by the user and stored or changed.

The first controller 320 stores an adjusted operation level of an electrical instrument having an adjustable operation level. Here, the first controller 320 stores an operation level determined before an arbitration function of the electrical instrument is performed.

When an operation end signal is transmitted from a general electrical instrument, the first controller 320 may determine whether the current power rate level of the corresponding general electrical instrument is equal to the power rate level before the general electrical instrument is operated, restore the current operation level of the general electrical instrument to the operation level before the general electrical instrument is operated when the current power rate level corresponds to the power rate level before the general electrical instrument is operated, and control the general electrical instrument to be driven at the restored operation level. If the current power rate level of the general electrical instrument is different from the power rate level before the general electrical instrument is operated, the first controller 320 may re-determine the operation level of the general electrical instrument on the basis of the current power rate level and power information for each operation level of the general electrical instrument, and control the general electrical instrument to be driven at the re-determined operation level.

The first controller 320 adds up peak instantaneous power of an electrical instrument to be driven and power consumption amounts of general electrical instruments connected to the smart sockets on the basis of the information stored in the first storage unit 330 so as to predict a power amount for each time period, compares the predicted power amount with the permissible power amount, and controls the electrical instruments to be normally driven at determined operation levels if the predicted power amount is less than the permissible power amount.

The first storage unit 330 stores information about groups to which the smart electrical instruments belong, power information of each smart electrical instrument, such as, peak instantaneous power, an average power consumption amount, and operation time, arbitration function information, and peak instantaneous power and average utilization time of the general electrical instruments 400d and 400e, which are measured for a predetermined time.

As described above, the operation levels of the smart electrical instruments are adjusted as the general electrical instruments are operated by measuring power consumption amounts of the general electrical instruments using the smart sockets, and thus, it is possible to prevent the total power consumption amount from exceeding the permissible power amount.

The smart electrical instruments have the same configurations as those described in the above embodiment of the present invention so that explanations thereof are omitted.

The general electrical instruments 400d and 400e perform operations selected by the user. The general electrical instruments 400d and 400e are connected to the smart sockets 500a and 500b to be provided with power through the smart sockets 500a and 500b, and power amounts consumed by the general electrical instruments 400d and 400e are measured by the smart sockets 500a and 500b, respectively.

The smart sockets 500a and 500b are respectively connected to the general electrical instruments 400d and 400e and include terminals inserted into a commercial power socket and recesses into which plugs of the general electrical instruments are inserted. The smart sockets 500a and 500b have identification numbers (ID) or codes such that the user can identify the smart sockets 500a and 500b.

Here, the identification numbers or codes may be printed or engraved on the smart sockets 500a and 500b, and the codes are bar-codes or QR (Quick Response) codes.

The smart socket 500a includes a second communication unit 510a which communicates with the EMS 300, a second controller 520a which controls communication between the second communication unit 510a and the EMS 300, and a power metering unit 530a which meters power consumed by the general electrical instrument connected to the smart socket 500a. The smart socket 500b has the same configuration as that of the smart socket 500a.

The second communication unit 510a receives PAN ID from the EMS 300, transmits the PAN ID to the second controller 520a, and sends power consumption information of the general electrical instrument connected to the smart socket 500a to the EMS 300.

The second communication unit 510a continuously transmits a communication signal even if communication with the EMS 300 is disconnected.

The second controller 520a sets the PAN ID transmitted from the EMS 300 and controls the operation of the power metering unit 530a to meter power consumed by the general electrical instrument connected to the smart socket 500a.

The power metering unit 530a meters power using a voltage across both ends of an AC power line connected to a power connector of the general electrical instrument and current measured from one of AC power lines connected to the power connector, and transmits the measured power to the EMS 300 through the second communication unit 510a.

Figure 7:
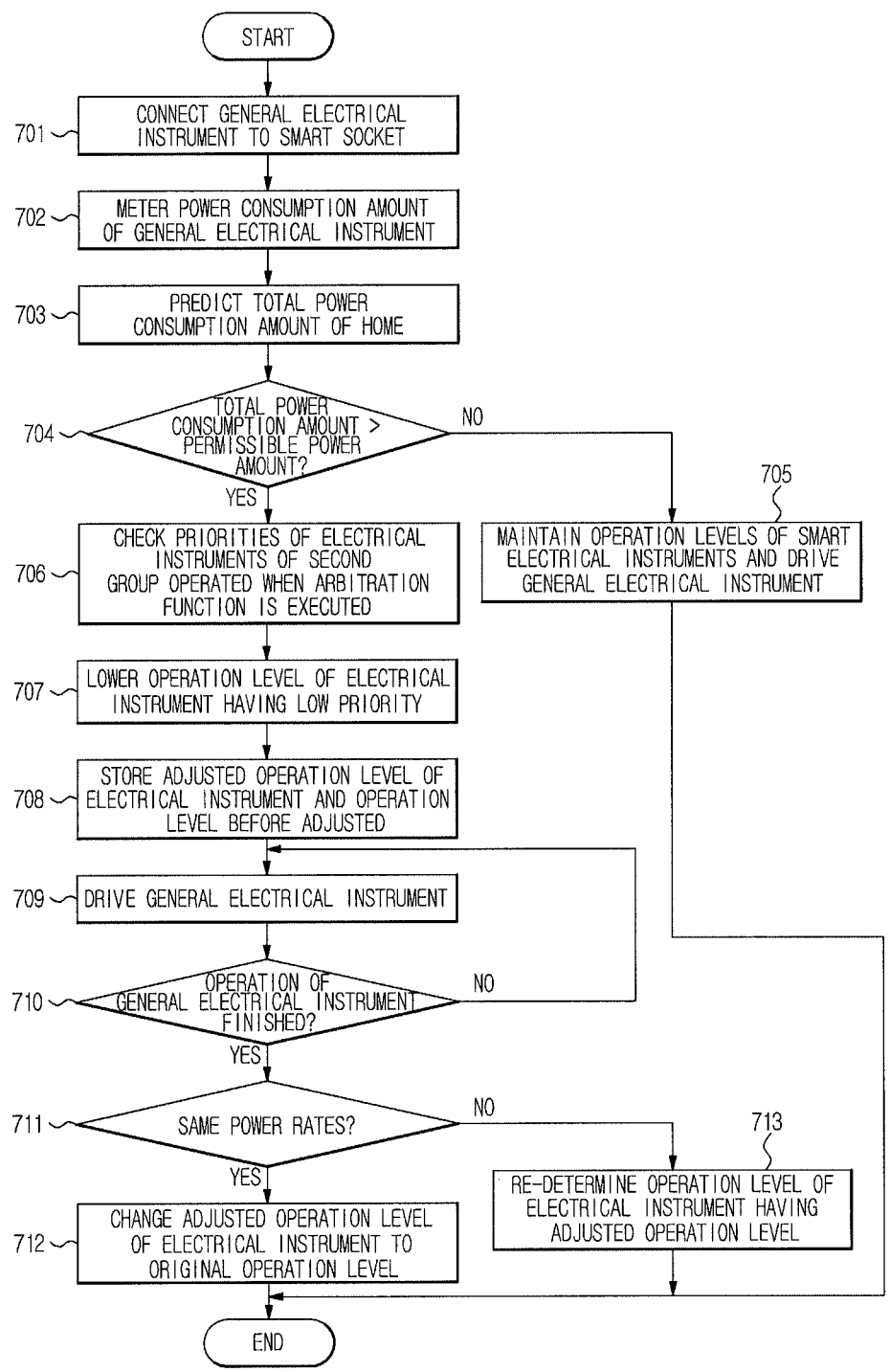
FIG. 7 is a flowchart illustrating a process of controlling the power management system, according to another example embodiment.

FIG. 7 is a flowchart illustrating a process of controlling the power management system, according to another embodiment of the present invention.

The EMS 300 receives power information for each operation level from the plurality of smart electrical instruments.

The EMS 300 determines a group to which a new electrical instrument belongs on the basis of the power information for each operation level of the smart electrical instruments and stores information about the group to which the new electrical instrument belongs and power information of the new electrical instrument.

More specifically, the EMS 300 confirms whether operation time of an electrical instrument is set in power information for each operation level of the electrical instrument, and determines the electrical instrument as the first group G1 if the operation time is set. If the operation time is not set, the EMS 300 confirms whether an operation level can be set, determines the electrical instrument as the second group G2 if the operation level can be set, and determines the electrical instrument as the third group G3 if the operation level cannot be set.

The EMS 300 determined whether a driving signal or a reservation signal is input from at least one electrical instrument.

Here, the EMS 300 searches the group list to check the group to which the corresponding electrical instrument belongs when the user inputs an electrical instrument driving instruction signal.

After confirmation of the group of the corresponding electrical instrument, the EMS 300 checks whether the corresponding electrical instrument belongs to the third group, and performs a process of determining an operation level of the corresponding group on the basis of a next power rate level if the electrical instrument does not belong to the third group so as to determine an operation level of the electrical instrument.

On the other hand, when the electrical instrument belongs to the third group, the EMS 300 determines operation time corresponding to minimum power rates on the basis of the peak instantaneous power and average power consumption amount of the electrical instrument, and recommends the determined operation time. That is, the EMS 300 informs the user of the recommended operation time using characters or sound.

In other words, the EMS 300 can effectively drive the electrical instrument and reduce power consumption by appropriately controlling operation algorithms differentiated depending on operation levels according to power rate levels.

If a general electrical instrument, for example, the electrical instrument 400d is connected to at least one smart socket, for example, the smart socket 500a while the plurality of smart electrical instruments are driven at the determined operation levels (701), the smart socket 500a meters power consumed by the general electrical instrument 400d connected thereto for a predetermined time (702) and transmits the metered power amount to the EMS 300.

Here, the EMS 300 adds up the power amount transmitted from the smart socket 500a and a peak instantaneous power amount of the general electrical instrument 400d to be driven on the basis of the information stored in the first storage unit 330, and adds the sum of the power amount and the peak instantaneous power amount to a peak instantaneous power amount consumed when the general electrical instrument 400d is operated so as to predict a total power consumption amount of the home having the electrical instruments (703). Then, the EMS 300 compares the predicted total power consumption amount with a predetermined permissible power amount (704).

Here, the EMS 300 controls the smart electrical instruments to be driven at the determined operation levels if the total power consumption amount is less than the permissible power amount, and controls the general electrical instrument 400d to operate (705).

If the total power consumption amount exceeds the permissible power amount, then the EMS 300 confirms priority order of the smart electrical instruments, which are driven when the general electrical instrument 400d is operated (706).

Here, the EMS 300 confirms the priority order of the smart electrical instruments belonging to the second group, which enables easiest operation level change and does not bring about user inconvenience and adjusts the operation levels of the smart electrical instruments, based on the confirmed priority order.

Adjusting the operation levels of the smart electrical instruments belonging to the second group on the basis of the priority order may be implemented by two methods. These two methods correspond to the methods for adjusting the operation levels of the electrical instruments belonging to the second group, described in the above embodiment, and thus, explanations thereof are omitted.

The EMS 300 stores the operation level of an electrical instrument 400*d*, having an adjustable operation level. Here, the EMS 300 stores the operation level determined before the electrical instrument 400*d* is operated (708) and transmits the adjusted operation level to the electrical instrument 400*d*.

Accordingly, the electrical instrument 400*d* having the adjusted operation level is driven by an operation algorithm corresponding to the operation level adjusted by the EMS 300. An electrical instrument, having an unadjusted operation level, is driven according to an operation algorithm corresponding to an operation level determined by the EMS 300. Subsequently, the general electrical instrument 400*d* is operated (709).

Then, the EMS 300 determines whether the operation of the general electrical instrument 400*d* is finished (710).

In this case, determining whether the operation of the general electrical instrument 400*d* is finished may be implemented by the following two methods.

In a first method, if information about an operation start time and operation end time of the general electrical instrument 400*d* is present, the EMS 300 predicts a time for restoring the adjusted operation level of the electrical instrument 400*d* on the basis of the operation start time and operation end time of the general electrical instrument 400*d*, and determines that the operation of the general electrical instrument 400*d* is finished at the predicted restoration time.

If the information about the operation start time and operation end time of the general electrical instrument 400*d* is not present, then the EMS 300 may calculate average time of previous operations of the general electrical instrument 400*d*, and predict the restoration time on the basis of the calculated average time.

In a second method, the EMS 300 displays information representing that the restoration time cannot be predicted on the first display unit 340 when the time for restoring the adjusted operation level of the electrical instrument 400*d* cannot be predicted, and determines that the operation of the general electrical instrument 400*d* is finished when an operation end signal is transmitted from the general electrical instrument 400*d*.

Subsequently, the EMS 300 determines whether a power rate level corresponding to the predicted restoration time is equal to the power rate level before the general electrical instrument 400*d* is operated (711) at the restoration time when the operation of the general electrical instrument 400*d* is finished. If the power rate level corresponding to the predicted restoration time is equal to the power rate level before the general electrical instrument 400*d* is operated, the EMS 300 restores the adjusted operation level of the electrical instrument to the operation level before the general electrical instrument 400*d* is operated (712), and drives the electrical instrument 400*d* by an operation algorithm corresponding to the restored operation level.

On the other hand, if the power rate level corresponding to the predicted restoration time is different from the power rate level before the general electrical instrument 400*d* is operated, the EMS 300 re-determines the operation level of the electrical instrument 400*d* (713) on the basis of the power rate level at the restoration time and power information for each operation level of the electrical instrument 400*d*, and drives the electrical instrument 400*d*, according to an operation algorithm corresponding to the re-determined operation level.

Figure 8:
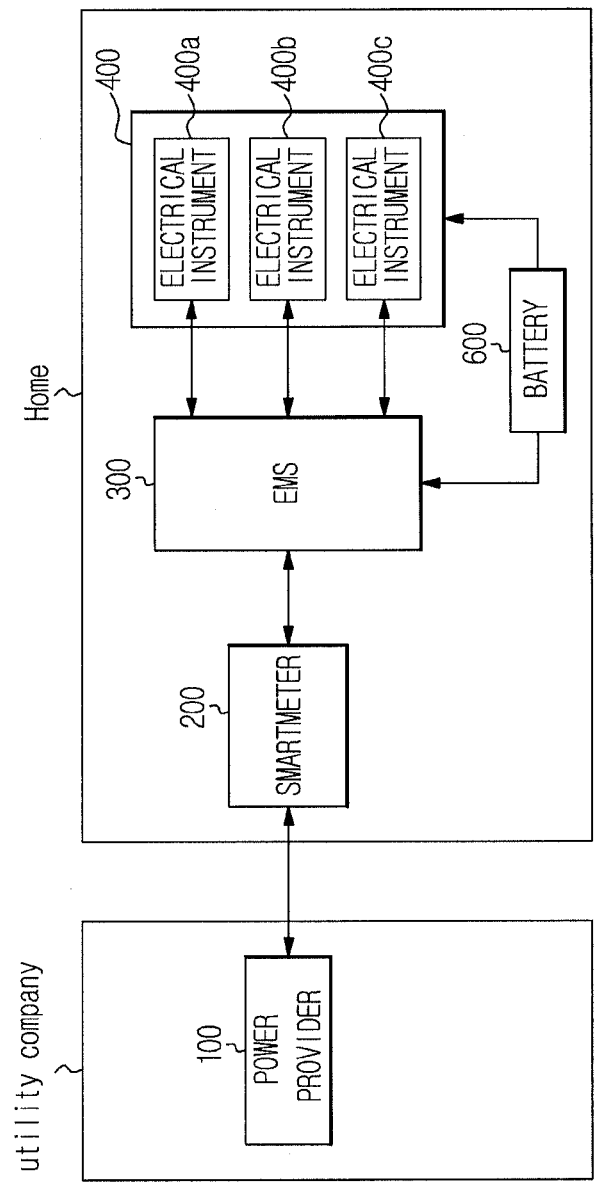
FIG. 8 is a block diagram of a power management system, according to another example embodiment.

FIG. 8 is a block diagram of a power management system according to another embodiment of the present invention. The power management system includes the power provider 100, the smartmeter 200, the EMS 300, the electrical instrument 400 (400*a*, 400*b* and 400*c*), and a battery 600. Here, the power provider 100 and the smartmeter 200 are identical to those described in the above embodiment, and thus, explanations thereof are omitted.

The EMS 300 includes the first communication unit 310, the first controller 320, the first storage unit 330, the first display unit 340, the first sound unit 350, and the first input unit 360. Here, the first communication unit 310, the first storage unit 330, the first display unit 340, the first sound unit 350 and the first input unit 360 are identical to those of the EMS 300 described in the above embodiment, and thus, explanations thereof are omitted.

Also, a configuration for determining a group of an electrical instrument and an operation level of the electrical instrument in the first controller 320 of the EMS 300 is identical to that of the EMS 300 described in the above embodiment, and thus, explanation thereof is omitted.

The first controller 320 receives power rate information from the power provider 100, and determines operation levels of the electrical instruments 400*a*, 400*b* and 400*c* on the basis of power rate levels and power information for each operation level of the electrical instruments 400*a*, 400*b* and 400*c*. When an arbitration function execution selection signal is transmitted from at least one of the electrical instruments 400*a*, 400*b* and 400*c*, for example, the electrical instrument 400*a*, while the electrical instruments 400*a*, 400*b* and 400*c* are driven at determined operation levels, the first controller 320 controls the battery 600 to supply power.

The first controller 310 blocks power supply of the battier 600 when an arbitration function execution end signal is transmitted from at least one electrical instrument.

The first display unit 340 displays a state in which the battery 600 supplies power to the electrical instruments 400*a*, 400*b* and 400*c*, and the first sound unit 350 outputs this state as sound.

As described above, it is possible to manage the total power consumption amount of the home having the electrical instruments 400*a*, 400*b* and 400*c* such that the total power consumption amount does not exceed a permissible power amount while an arbitration function of an electrical instrument is performed by controlling power supply from the battery and predicting the total power consumption amount of the home on the basis of a power amount and time consumed when the arbitration function is performed.

The electrical instrument 400 transmits predetermined information to the EMS 300. Here, the predetermined information includes the name of the electrical instrument 400, power information for each operation level, and arbitration function information.

In other words, the electrical instrument 400 transmits the power information for each operation level to the EMS 300, executes an operation algorithm at an operation level determined by the EMS 300, according to an instruction of the user or at reservation time so as to perform a characteristic function thereof, and performs an arbitration function regardless of power rate levels when the arbitration function is selected.

The electrical instrument 400 is driven by an operation algorithm corresponding to an operation level transmitted from the EMS 300, provided with power from the battery 600 when the total power consumption amount of the home exceeds the permissible power amount due to execution of an arbitration function of another electrical instrument, and operated using power supplied through the battery 600.

Other configurations of the electrical instrument 400 are identical to those of the electrical instrument 400 described in the above embodiment, and thus, explanations thereof are omitted.

Figure 9:
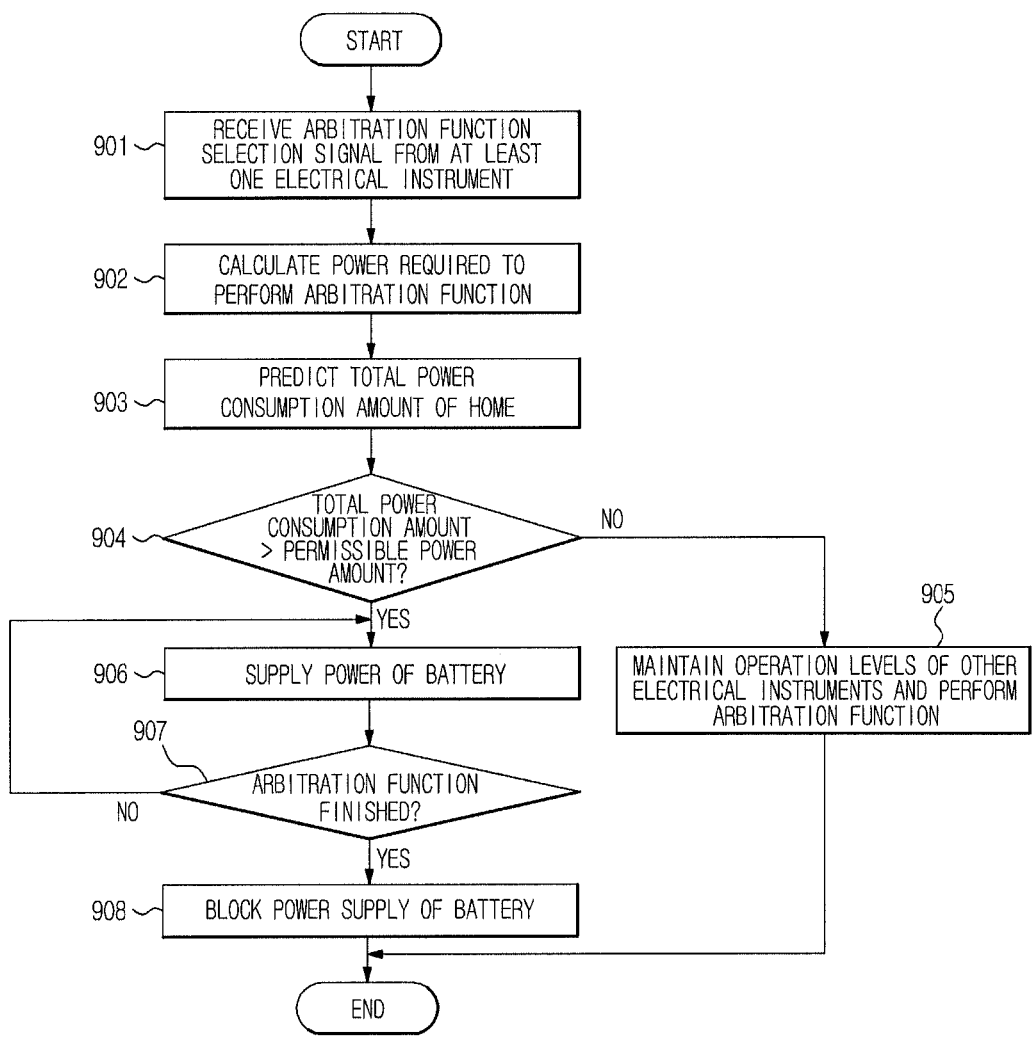
FIG. 9 is a flowchart illustrating a process of controlling the power management system, according to another example embodiment.

FIG. 9 is a flowchart illustrating a process of controlling the power management system according to another embodiment of the present invention.

The EMS 300 receives power information for each operation level from the plurality of smart electrical instruments 400a, 400b and 400c.

The EMS 300 determines groups to which the plurality of electrical instruments 400a, 400b and 400c belong on the basis of the power information for each operation level of the electrical instruments 400a, 400b and 400c and stores information about the groups to which the electrical instruments belong and power information of the electrical instruments.

More specifically, the EMS 300 confirms whether operation time of an electrical instrument is set in power information for each operation level of the electrical instruments, and determines the electrical instrument as the first group G1 if the operation time is set. If the operation time is not set, the EMS 300 confirms whether an operation level can be set, determines the electrical instrument as the second group G2 if the operation level can be set, and determines the electrical instrument as the third group G3 if the operation level cannot be set.

The EMS 300 determines whether a driving signal or a reservation signal is input from at least one electrical instrument.

Here, the EMS 300 searches the group list to check the group of the corresponding electrical instrument when the user inputs an electrical instrument driving instruction signal.

After confirmation of the group of the corresponding electrical instrument, the EMS 300 checks whether the corresponding electrical instrument belongs to the third group, and performs a process of determining an operation level of the corresponding group on the basis of a next power rate level if the electrical instrument does not belong to the third group to determine an operation level of the electrical instrument.

On the other hand, when the electrical instrument belongs to the third group, the EMS 300 determines operation time corresponding to minimum power rates on the basis the peak instantaneous power and average power consumption amount of the electrical instrument, and recommends the determined operation time. That is, the EMS 300 informs the user of the recommended operation time using characters or sound.

When an arbitration function selection signal is input from at least one electrical instrument 400a (901) while the electrical instruments 400a, 400b and 400c are driven at determined operation levels, the EMS 300 checks a power amount consumed when the electrical instrument 400a performs an arbitration function (902).

Then, the EMS 300 adds up peak instantaneous power amounts of an electrical instrument to be driven on the basis of the information stored in the first storage unit 330, and adds the sum of the peak instantaneous power amounts to a power amount consumed when the electrical instrument 400a performs the arbitration function so as to predict a total power consumption amount of the home having the electrical instruments when the arbitration function is executed (903). Then, the EMS 300 compares the predicted total power consumption amount with a predetermined permissible power amount (904).

Here, the EMS 300 controls the determined operation levels of the remaining electrical instruments and drives the remaining electrical instruments at the determined operation levels if the total power consumption amount is less than the permissible power amount, and controls the electrical instrument 400a to perform the arbitration function (905).

If the total power consumption amount exceeds the permissible power amount, the EMS 300 controls the battery 600 to supply power to the EMS 300 and the electrical instruments 400a, 400b and 400c (906).

Subsequently, the EMS 300 determines whether the arbitration function of the electrical instrument 400a is finished (907).

Determining whether the arbitration function is finished may be implemented by the following two methods.

According to a first method, if information about an arbitration function execution start time and arbitration function execution end time of the electrical instrument 400a is present, the EMS 300 predicts a time for blocking power supply of the battery 600 on the basis of the arbitration function execution start time and arbitration function execution end time of the electrical instrument 400a, and determines that the arbitration function is finished at the predicted blocking time.

If the information about the arbitration function execution start time and arbitration function execution end time of the electrical instrument 400a is not present, the EMS 300 may calculate average time of previous arbitration function execution and predict the blocking time on the basis of the calculated average time.

According to a second method, the EMS 300 displays information representing that the blocking time cannot be predicted on the first display unit 340 when the time for blocking the power supply of the battery 600 cannot be predicted, and determines that the arbitration function is finished when an arbitration function execution end signal is transmitted from the electrical instrument 400a.

Subsequently, the EMS 300 blocks power supply of the battery 600 (908) when the arbitration function of the electrical instrument 400a is finished.

When an arbitration function execution signal is received from at least one electrical instrument, operation levels of other electrical instruments can be adjusted on the basis of at least one of daily power rates, monthly power rates and yearly power rates of a power management area.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A power management apparatus, comprising:
a communication unit to communicate with a plurality of electrical instruments; and
a controller to predict a power consumption amount of a power management area when receiving an arbitration function execution signal from at least one of the plurality of electrical instruments, compare the power consumption amount with a predetermined power amount, and adjust an operation level of at least one other electrical instrument when the power consumption amount exceeds the predetermined power amount, wherein the arbitration function execution signal corresponds to execution of at least one of a periodically performed function and a function selected by a user, wherein the operation level of the at least one other electrical instrument includes a power consumption amount consumed during operation execution at the operation level, and wherein the controller, in the adjusting of the operation level of the at least one other electrical instrument, adjusts a current operation level of the at least one other electronic instrument into an operation level having a lower power consumption amount such that an actual power consumption amount of the power management area is maintained below the predetermined power amount during the arbitration function execution.

2. The power management apparatus according to claim 1, further comprising a storage unit to store power information for respective operation levels and information about the arbitration function, transmitted from the plurality of electrical instruments.

3. The power management apparatus according to claim 2, wherein the information about the arbitration function includes at least one of a power amount consumed when the arbitration function is performed, an arbitration function execution start time, and an arbitration function execution end time.

4. The power management apparatus according to claim 3, wherein the controller adjusts the operation levels of the other electronic instruments, which are operated for a period of time, during which the arbitration function is performed.

5. The power management apparatus according to claim 3, wherein the predetermined power amount includes at least one of a permissible power amount for each time period and a monthly critical power amount.

6. The power management apparatus according to claim 5, wherein the communication unit communicates with a power supply source to receive at least one of the permissible power amount for each time period and the monthly critical power amount transmitted from the power supply source, and the controller controls the power amount transmitted from the power supply source to be stored.

7. The power management apparatus according to claim 5, wherein the controller predicts a power consumption amount for each time period of the power management area on the basis of the information about the arbitration function, compares the power consumption amount for each time period with the permissible power amount for each time period, and adjusts the operation levels of the other electrical instruments if a time period in which the power consumption amount exceeds the permissible power amount is present.

8. The power management apparatus according to claim 5, wherein the controller predicts a power consumption amount of a month of the power management area on the basis of the information about the arbitration function, compares the power consumption amount of the month with a critical power amount of the month, and adjusts the operation levels of the other electrical instruments when the power consumption amount of this month exceeds the critical power amount of the month.

9. The power management apparatus according to claim 2, wherein the communication unit receives power rate information transmitted from a power supply source, and the controller determines operation levels of the plurality of electrical instruments on the basis of the power rate information, the predetermined power amount, and power information for respective operation levels of the plurality of electrical instruments, and adjusts the determined operation levels of the other electrical instruments when the arbitration function of the at least one electrical instrument is performed.

10. The power management apparatus according to claim 9, wherein the controller determines if the current power rate information corresponds to power rate information before the arbitration function is performed when the arbitration function is finished, restores the operation levels of the other electrical instruments to operation levels before the arbitration function is performed if the current power rate information corresponds to the power rate information before the arbitration function is performed, and re-determines the operation levels of the other electrical instruments if the current power rate information is not identical to the power rate information before the arbitration function is performed.

11. The power management apparatus according to claim 10, wherein the controller confirms priorities of the other electrical instruments when the power consumption amount exceeds the predetermined power amount and lowers the operation levels of the other electrical instruments in ascending order of priority until the power consumption amount becomes less than the predetermined power amount.

12. The power management apparatus according to claim 10, wherein the controller confirms the priorities of the other electrical instruments when the power consumption amount exceeds the predetermined power amount and continuously lowers an operation level of an electrical instrument, having a lowest priority, until the power consumption amount becomes less than the predetermined power amount.

13. The power management apparatus according to claim 12, wherein the controller continuously lowers an operation level of an electrical instrument, having a second lowest priority, until the power consumption amount becomes less than the predetermined power amount when the power consumption amount exceeds the predetermined power amount, even in a state in which the operation level of the electrical instrument having the lowest priority has been adjusted to a lowest operation level.

14. The power management apparatus according to claim 2, wherein the power information for the respective operation levels of the plurality of electrical instruments includes at least one of a peak instantaneous power amount, an average power consumption amount, and an operation time for which power is consumed.

15. The power management apparatus according to claim 14, wherein the controller classifies the plurality of electrical instruments into a first group that sets operation time, a second group that cannot set the operation time, and a third group that cannot set the operation time and operation levels, and adjusts operation levels of electrical instruments belonging to the second group when the arbitration function execution signal is transmitted from the at least one of the plurality of electrical instruments.

16. The power management apparatus according to claim 1, wherein the controller maintains the operation levels of the other electrical instruments when the power consumption amount is less than the predetermined amount.

17. A method for controlling a power management apparatus, the method comprising:
predicting a power consumption amount of a power management area when an arbitration function execution signal is received from at least one of a plurality of electrical instruments;
comparing the power consumption amount with a predetermined power amount; and
adjusting an operation level of at least one other electrical instrument when the power consumption amount exceeds the predetermined power amount, wherein the arbitration function execution signal corresponds to execution of at least one of a periodically performed function and a function selected by a user, wherein the operation level of the at least one other electrical instrument includes a power consumption amount consumed during operation execution at the operation level, and wherein the adjusting of the operation level of the at least one other electrical instrument, includes adjusting a current operation level of the at least one other electronic instrument into an operation level having a lower power consumption amount such that an actual power consumption amount of the power management area is maintained below the predetermined power amount during the arbitration function execution.

18. The method according to claim 17, further comprising storing power information for respective operation levels and information about an arbitration function transmitted from the plurality of electrical instruments.

19. The method according to claim 18, wherein the information about the arbitration function includes at least one of a power amount consumed when the arbitration function is performed, an arbitration function execution start time, and an arbitration function execution end time.

20. The method according to claim 19, wherein the adjusting of the operation levels of the other electrical instruments comprises adjusting the operation levels of the other electronic instruments, which are operated for a period of time during which the arbitration function is performed.

21. The method according to claim 19, wherein the predetermined power amount includes at least one of a permissible power amount for each time period and a monthly critical power amount.

22. The method according to claim 21, wherein the comparing of the power consumption amount with the predetermined power amount comprises:
predicting a power consumption amount for each time period on the basis of the information about the arbitration function; and
comparing the power consumption amount for each time period with the permissible power amount for each time period.

23. The method according to claim 21, wherein the comparing of the power consumption amount with the predetermined power amount comprises:
predicting a power consumption amount of a month of the power management area on the basis of the information about the arbitration function; and
comparing the power consumption amount of the month with a critical power amount of the month.

24. The method according to claim 19, further comprising:
receiving power rate information from a power supply source and storing the power rate information; and
determining operation levels of the plurality of electrical instruments on the basis of the power rate information, the predetermined power amount, and power information for respective operation levels of the plurality of electrical instruments.

25. The method according to claim 24, wherein the adjusting of the operation levels of the other electrical instruments comprises adjusting determined operation levels of the other electrical instruments.

26. The method according to claim 24, further comprising:
determining whether the arbitration function is finished;
determining whether power rate information before the arbitration function is performed is identical to power rate information after the arbitration function is performed when the arbitration function is finished;
restoring the operation levels of the other electrical instruments to the operation levels when the arbitration function is performed, when the power rate information before the arbitration function is performed, is identical to the power rate information after the arbitration function is performed; and
re-determining the operation levels of the other electrical instruments when the power rate information, before the arbitration function is performed, is different from the power rate information after the arbitration function is performed.

27. The method according to claim 26, wherein the determining of whether the arbitration function is finished comprises determining whether an arbitration function execution end signal is received from the at least one electrical instrument.

28. The method according to claim 26, wherein the determining of whether the arbitration function is finished comprises predicting an arbitration function execution end time on the basis of the information about the arbitration function, and determining whether current time corresponds to the predicted time.

29. The method according to claim 21, wherein the adjusting of the operation levels of the other electrical instruments comprises selecting an electrical instrument, which cannot set an operation time, from the plurality of electrical instruments, and adjusting an operation level of the selected electrical instrument.

30. The method according to claim 17, wherein the adjusting of the operation levels of the other electrical instruments comprises confirming priorities of the other electrical instruments, and lowering the operation levels of the other electrical instruments in ascending order of priority until the power consumption amount becomes less than the predetermined power amount.

31. The method according to claim 30, wherein the priorities are set by the user.

32. The method according to claim 17, wherein the adjusting of the operation levels of the other electrical instruments comprises checking priorities of the other electrical instruments, confirming an electrical instrument having a lowest priority, and continuously lowering an operation level of the electrical instrument having the lowest priority until the power consumption amount becomes less than the predetermined power amount.

33. The method according to claim 32, further comprising:
determining whether the operation level of the electrical instrument, having the lowest priority, is the lowest operation level in a state in which the power consumption amount exceeds the predetermined power amount;
confirming an electrical instrument, having a second lowest priority, when the operation level of the electrical instrument having the lowest priority is the lowest operation level in the state in which the power consumption amount exceeds the predetermined power amount; and
continuously lowering an operation level of the electrical instrument, having the second lowest priority, until the power consumption amount becomes less than the predetermined power amount.

34. The method according to claim 32, wherein the priorities are set by the user.

35. The method according to claim 17, further comprising maintaining the operation levels of the other electrical instruments if the power consumption amount is less than the predetermined power amount.

36. The method according to claim 17, wherein the adjusting of the operation levels of the other electrical instruments comprises:
confirming whether a battery is present in the power management area when the power consumption amount exceeds the predetermined power amount;
supplying power of the battery to the plurality of electrical instruments when the battery is present; and
adjusting the operation levels of the other electrical instruments when the battery is not present.

37. The method according to claim 36, further comprising blocking power supply of the battery when the arbitration function is finished.

38. The method according to claim 17, further comprising:
comparing the power consumption amount of the power management area with the predetermined power amount when a power measurement signal is received from a smart socket; and
adjusting an operation level of at least one of the plurality of electrical instruments when the power consumption amount exceeds the predetermined power amount.

39. The method according to claim 38, wherein the adjusting of the operation level of the at least one of the plurality of electrical instruments comprises adjusting an operation level of an electrical instrument, which does not perform the arbitration function.

40. The method according to claim 38, further comprising maintaining the operation levels of the plurality of electrical instruments when the power consumption amount is less than the predetermined power amount.

41. The method according to claim 38, further comprising restoring the adjusted operation level of the at least one electrical instrument when the power measurement signal is not received from the smart socket.

42. An electrical instrument comprising:
a communication unit to communicate with a power management apparatus; and
a controller to determine whether a first arbitration function is executed, to transmit an arbitration function execution signal to the power management apparatus when the arbitration function is executed, to control execution of the arbitration function, to adjust an operation level of the electrical instrument when another electrical instrument performs a second arbitration function and an operation level adjustment signal is transmitted from the power management apparatus, and to control the electrical instrument to be driven at the adjusted operation level,
wherein the controller independently controls execution of the arbitration function and adjusting of the operation level at different time points respectively,
wherein the first arbitration function and the second arbitration function correspond to execution of at least one of a periodically performed function and a function selected by a user,
wherein the operation level includes a power consumption amount consumed during operation execution at the operation level, and
wherein the controller, in the adjusting of the operation level, adjusts a current operation level into an operation level having a lower power consumption amount such that an actual power consumption amount of the power management area is maintained below the predetermined power amount during the second arbitration function execution.

43. The electrical instrument according to claim 42, further comprising a storage unit to store a plurality of operation algorithms each of which has at least one characteristic function, operation levels respectively corresponding to the plurality of operation algorithms, power information for the respective operation levels, and information about the arbitration function.

44. The electrical instrument according to claim 42, wherein the communication unit transmits the power information for the respective operation levels and the information about the arbitration function to the power management apparatus, according to an instruction of the controller.

45. The electrical instrument according to claim 42, further comprising an input unit by which a user selects the first arbitration function.

46. An electrical instrument, comprising:
a communication unit to communicate with a power management apparatus; and
a controller to adjust an operation level of the electrical instrument when another electrical instrument performs an arbitration function and transmits a corresponding arbitration function execution signal upon performing the arbitration function to the power management apparatus, and an operation level adjustment signal is transmitted from the power management apparatus, and control the electrical instrument to be driven at the adjusted operation level,
a storage unit to store a plurality of operation levels, having different power consumption amounts,
wherein an arbitration function corresponds to execution of at least one of a periodically performed function and a function selected by a user,
wherein the controller changes the operation level to an operation level having power consumption lower than that of the current operation level, when the operation level adjustment signal is inputted.

47. The electrical instrument according to claim 46, further comprising an input unit by which a user inputs at least one function,
wherein the controller sets the function input through the input unit as an arbitration function.

48. A power management system, comprising:
a plurality of electrical instruments having arbitration functions and a plurality of operation levels having different power consumption amounts; and
a power management apparatus to predict a power consumption amount of a power management area when receiving an arbitration function execution signal corresponding to at least one of the arbitration functions from at least one of the plurality of electrical instruments, compare the power consumption amount with a predetermined power amount, and adjust an operation level of at least one other electrical instrument when the power consumption amount exceeds the predetermined power amount,
wherein the arbitration functions correspond to execution of at least one of a periodically performed function and a function selected by a user,
wherein the operation level of the at least one other electrical instrument includes a power consumption amount consumed during operation execution at the operation level, and
wherein the power management apparatus, in the adjusting of the operation level of the at least one other electrical instrument, adjusts a current operation level of the at least one other electronic instrument into an operation level having a lower power consumption amount such that an actual power consumption amount of the power management area is maintained below the predetermined power amount during the arbitration function execution.

49. The power management system according to claim 48, wherein the information about the arbitration function includes at least one of a power amount consumed when the arbitration function is performed, an arbitration function execution start time, and an arbitration function execution end time.

50. The power management system according to claim 48, wherein the power management apparatus adjusts the operation levels of the other electrical instruments on the basis of a predetermined priority when the power consumption amount exceeds the predetermined power amount.

51. The power management system according to claim 50, wherein the power management apparatus lowers the operation levels of the other electrical instruments, level by level, in ascending order of priority until the power consumption amount becomes less than the predetermined power amount.

52. The power management system according to claim 50, wherein the power management apparatus lowers an operation level of an electrical instrument having a lowest priority to an operation level having a power consumption amount less than the predetermined power amount.

53. The power management system according to claim 48, wherein the power management apparatus determines the operation levels of the plurality of electrical instruments on the basis of power rate information transmitted from a power supply source and power consumption amounts corresponding to the operation levels of the plurality of electrical instruments.

54. The power management system according to claim 53, wherein the power management apparatus stores determined operation levels of the plurality of electrical instruments and restores the operation levels of the other electrical instruments to the stored operation levels when the arbitration function is finished.

55. The power management system according to claim 48, wherein the power management apparatus classifies the plurality of electrical instruments into a first group which can set operation time, a second group, which cannot set the operation time, and a third group, which cannot set the operation time and an operation level, and adjusts operation levels of electrical instruments belonging to the second group when adjusting the operation levels.

56. A power management system, comprising:
a plurality of electrical instruments having arbitration functions and a plurality of operation levels having different power consumption amounts;
a battery to supply power to at least one of the plurality of electrical instruments or cut off supplied power; and
a power management apparatus to predict a power consumption amount of a power management area when receiving an arbitration function execution signal corresponding to execution of at least one of the arbitration functions from at least one of the plurality of electrical instruments, to compare the power consumption amount with a predetermined power amount, and to supply the power of the battery to the plurality of electrical instruments when the power consumption amount exceeds the predetermined power amount,
wherein the arbitration functions correspond to execution of at least one of a periodically performed function and a function selected by a user,
wherein the power management apparatus, in the supplying of the power of the battery to the plurality of electrical instruments, adjusts to an actual power consumption amount of the power management area which is maintained below the predetermined power amount during the arbitration function execution.

57. The power management system according to claim 56, wherein the power management apparatus determines the operation levels of the plurality of electrical instruments on the basis of power rate information transmitted from a power supply source and power consumption amounts corresponding to the operation levels of the plurality of electrical instruments, and controls the plurality of electrical instruments to be driven at the determined operation levels.

58. The power management system according to claim 56, wherein the power management apparatus blocks power supply to the plurality of electrical instruments from the battery when an arbitration function is finished.

59. The power management system according to claim 56, wherein the power management apparatus calculates a power excess amount when the power consumption amount exceeds the predetermined power amount and adjusts the operation levels of the other electrical instruments when the calculated power excess amount is less than the power amount of the battery.

60. A power management system, comprising:
a plurality of first electrical instruments having a plurality of operation levels having different power consumption amounts;
a smart socket connected to a second electrical instrument to meter power of the second electrical instrument; and
a power management apparatus to predict a power consumption amount of a power management area when receiving a power measurement signal corresponding to current power usage of the second electrical instrument through the smart socket, compare the power consumption amount with a predetermined power amount, and adjust an operation level of at least one of the first electrical instruments when the power consumption amount exceeds the predetermined power amount,
wherein the operation level of the plurality of first electrical instruments includes a power consumption amount consumed during operation execution at the operation level, and
wherein the power management apparatus, in the adjusting of the operation level of the first electrical instrument, adjusts a current operation level of the first electronic instrument into an operation level having a lower power consumption amount such that an actual power consumption amount of the power management area is maintained below the predetermined power amount during the arbitration function execution.

61. The power management system according to claim 60, wherein the power management apparatus predicts the power consumption amount of the power management area on the basis of a power amount measured for a predetermined time when receiving the power measurement signal through the smart socket, and compares the predicted power consumption amount with the predetermined power amount.

62. The power management system according to claim 60, wherein the power management apparatus maintains operation levels of the plurality of electrical instruments when the power consumption amount is less than the predetermined power amount.

63. The power management system according to claim 60, wherein the power management apparatus restores the operation level of the at least one first electrical instrument when the power measurement signal is not received through the smart socket.

64. An energy management system comprising:
a controller interfaced to a smartmeter and interfaced to a plurality of electrical instruments of an energy management area, the plurality of electrical instruments each having at least one function;
wherein the controller sets operation levels of the plurality of electrical instruments according to data received from the smartmeter;
wherein at least one electrical instrument has a characteristic function and an arbitration function, the arbitration function consuming more power than the characteristic function; and
wherein the at least one electrical instrument sends an arbitration function execution signal upon executing the arbitration function, causing the controller to adjust the operation level of at least one of the plurality of electrical instruments.

* * * * *